(12) United States Patent
Kitsunai et al.

(10) Patent No.: US 10,567,722 B2
(45) Date of Patent: Feb. 18, 2020

(54) IMAGE PROCESSING APPARATUS, IMAGE PROCESSING METHOD, IMAGING APPARATUS, AND RECORDING MEDIUM

(71) Applicant: CANON KABUSHIKI KAISHA, Tokyo (JP)

(72) Inventors: Takahiro Kitsunai, Kawasaki (JP); Toshitaka Aiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 15/850,167

(22) Filed: Dec. 21, 2017

(65) Prior Publication Data
US 2018/0184061 A1 Jun. 28, 2018

(30) Foreign Application Priority Data
Dec. 27, 2016 (JP) ................................. 2016-254385

(51) Int. Cl.
H04N 5/225 (2006.01)
H04N 9/73 (2006.01)
H04N 5/235 (2006.01)
H04N 5/232 (2006.01)

(52) U.S. Cl.
CPC .......... H04N 9/735 (2013.01); H04N 5/2355 (2013.01); H04N 5/23293 (2013.01)

(58) Field of Classification Search
CPC .... H04N 5/2355; H04N 5/2351; H04N 5/265; H04N 5/355; H04N 5/3572; H04N 5/35554; H04N 5/35536; H04N 5/35581
See application file for complete search history.

(56) References Cited

U.S. PATENT DOCUMENTS

| 6,677,992 B1* | 1/2004 | Matsumoto .......... H04N 5/2258 348/229.1 |
| 9,652,687 B2 | 5/2017 | Sato |
| 9,667,882 B2 | 5/2017 | Matsuoka |
| 2013/0100251 A1* | 4/2013 | Endo ........................ G03B 7/08 348/46 |
| 2014/0204241 A1* | 7/2014 | Ohara ................ H04N 5/23212 348/223.1 |
| 2015/0181103 A1* | 6/2015 | Kimura ................ H04N 5/2355 348/360 |
| 2015/0281540 A1* | 10/2015 | Matsuoka ............ H04N 5/2355 348/362 |

FOREIGN PATENT DOCUMENTS

| JP | 2015-156615 A | 8/2015 |
| JP | 2016-058993 A | 4/2016 |

* cited by examiner

*Primary Examiner* — Kelly L Jerabek
(74) *Attorney, Agent, or Firm* — Cowan, Liebowitz & Latman, P.C.

(57) ABSTRACT

An image processing apparatus can acquire a plurality of pieces of visual point image data having different visual points from an imaging element having a pupil division pixel, and perform a gradation process on an image. When there are a plurality of types of high-brightness-side gradation distributions which can be reflected at a developing time, the image processing apparatus displays a user interface screen on a display unit and displays a histogram representing brightness of an image for each high brightness gradation improvement method. An area in which high brightness gradation is adjustable is displayed on a displayed image to be distinguished for each of the high brightness gradation improvement methods and for each setting condition.

9 Claims, 21 Drawing Sheets

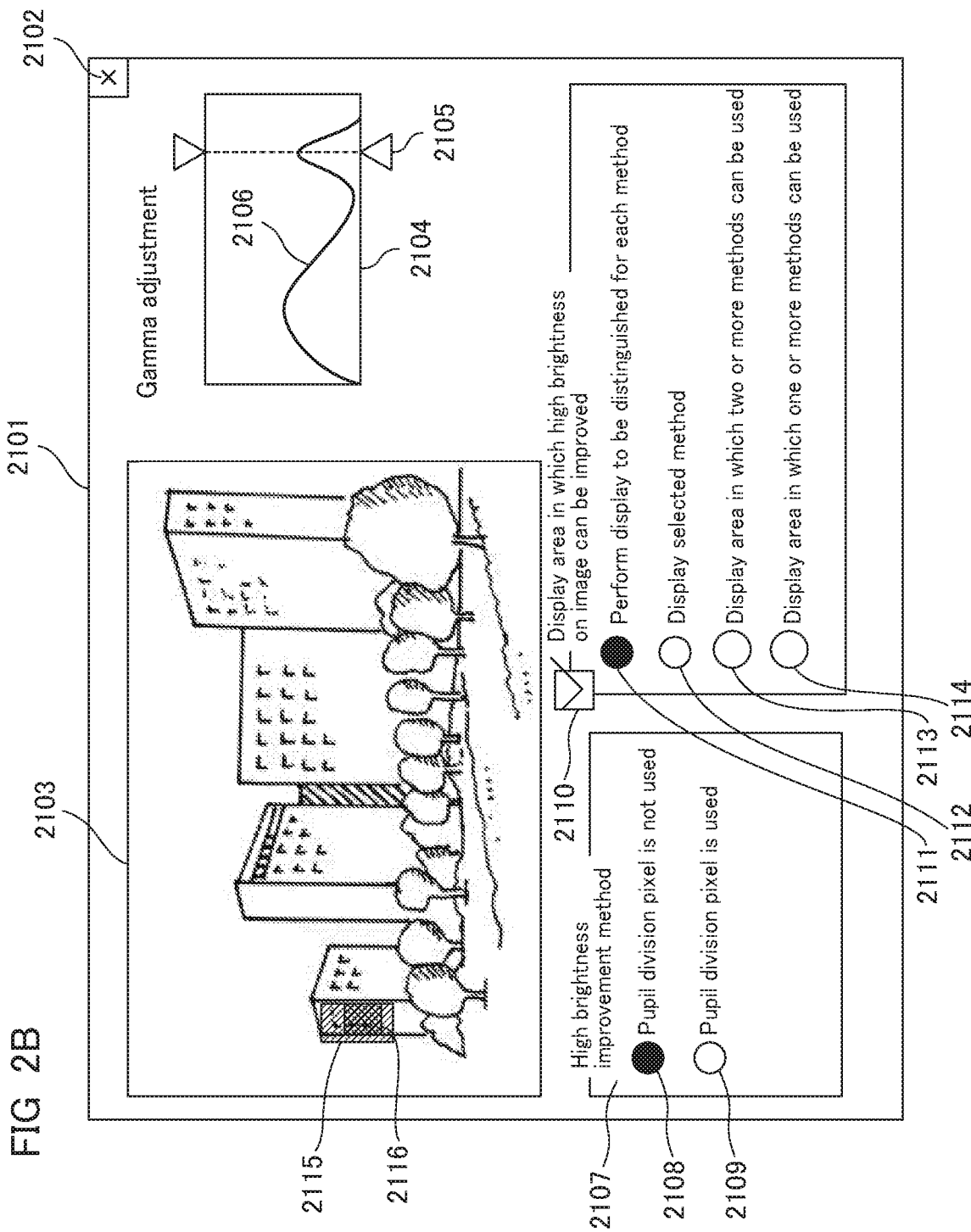

IMAGE PROCESSING APPARATUS, IMAGE PROCESSING METHOD, IMAGING APPARATUS, AND RECORDING MEDIUM

BACKGROUND OF THE INVENTION

Field of the Invention

The present invention relates to gradation process technology of image data.

Description of the Related Art

Recording or displaying image data is performed by performing an image process including a developing process on image data acquired by an imaging element of an imaging apparatus. There is a process of reflecting data of a dynamic range which is discarded through clipping at a saturation level by adjusting a level for each color signal after a white balance adjustment when developing captured undeveloped data in the developed image data (Japanese Patent Laid-Open No. 2015-156615). Hereinafter, such a gradation process will be referred to as a first high brightness improvement process.

A pupil division type imaging element can acquire first image data obtained only by one of a first pixel and a second pixel and second image data obtained by adding data acquired from undeveloped image data from the first pixel and the second pixel. Since aperture ratios of pixels in the first image data and the second image data are different, two types of exposed images are obtained. There is a method for enlarging a dynamic range of images of two different types of exposures by combining the images (Japanese Patent Laid-Open No. 2016-58993).

In the related art, an image processing apparatus capable of adaptively performing a gradation process when there are a plurality of high-brightness-side gradation distributions which can be reflected at a developing time is not disclosed.

SUMMARY OF THE INVENTION

The present invention provides an image processing apparatus and an image processing method which are capable of adaptively performing a gradation process on an image area on which a plurality of image processes can be performed.

An image processing apparatus according to an embodiment of the present invention includes: one or more processors; and a memory storing instructions which, when the instructions are executed by the one or more processors, cause the image processing apparatus to function as: an acquisition unit configured to acquire photographed image data and a plurality of pieces of visual point image data having different visual points; a first processing unit configured to perform a first gradation process without using the plurality of pieces of visual point image data; a second processing unit configured to perform a second gradation process using the plurality of pieces of visual point image data; and a control unit configured to perform control to output an image area in which a gradation process is able to be performed by the first or second processing unit or an image area in which the gradation process is able to be performed by the first and second processing units.

Further features of the present invention will become apparent from the following description of exemplary embodiments with reference to the attached drawings.

BRIEF DESCRIPTION OF THE DRAWINGS

FIGS. 2A and 2B are diagrams illustrating a user interface (UI) display screen example according to the first embodiment.

DESCRIPTION OF THE EMBODIMENTS

Figure 1A:
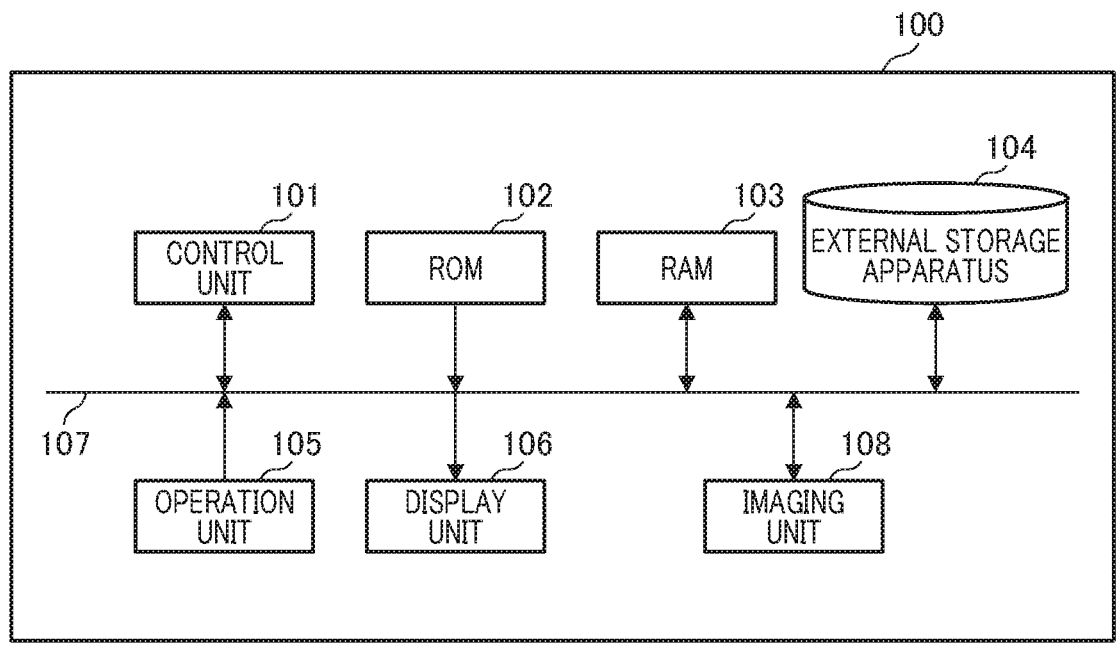
FIGS. 1A and 1B are diagrams for describing an example of a configuration according to a first embodiment of the present invention.

Hereinafter, embodiments of the present invention will be described in detail with reference to embodiments illustrated in the drawings. In the embodiments, an image processing apparatus capable of acquiring a plurality of pieces of visual point image data and performing a plurality of gradation processes will be exemplified below. Note that the plurality of pieces of visual point image data are pieces of image data acquired with different visual points and having parallax with respect to each other.

First Embodiment

In a first embodiment a RAW developing apparatus is exemplified as an image processing apparatus configured to process RAW image data. RAW image data is image data which is not subject to an image process such as a developing process. FIG. 1A is a block diagram showing a configuration of a RAW developing apparatus 100 according to the first embodiment. The RAW developing apparatus 100 is realized using, for example, hardware such as a personal computer (PC) and software.

In FIG. 1A, a control unit 101 is a central unit configured to control the entire RAW developing apparatus 100 and includes, for example, a central processing unit (CPU). A first memory 102 is a read only memory (ROM) configured to store a program or parameter and stores a code, data, or the like which does not need to be changed. A second memory 103 is a random access memory (RAM) configured to temporarily store a program or data supplied from an external apparatus or the like. An external storage apparatus 104 is, for example, a hard disk or a flash memory fixedly installed in the RAW developing apparatus 100. Alternatively, a flexible disk (FD), an optical disk such as a compact disk (CD), a magnetic or optical card, an integrated circuit (IC) card, a memory card, or the like attachable to or detachable from the RAW developing apparatus 100 can be used.

An operation unit 105 receives a user's operation and outputs an operation instruction signal to the control unit 101. The operation unit 105 includes a keyboard or a pointing device for inputting data. Data held in or supplied from the RAW developing apparatus 100 is displayed on a screen of a display unit 106. A system bus 107 communicably connects the units (reference numerals 101 to 106). Note that, when the RAW developing apparatus 100 has an imaging function, the RAW developing apparatus 100 includes an imaging unit 108. The imaging unit 108 includes an imaging optical system including optical members such as a lens or a diaphragm and an imaging element configured to photoelectrically convert an optical image formed through the imaging optical system. The control unit 101 performs an image process such as developing on image data acquired from the imaging unit 108.

An operation example of the RAW developing apparatus 100 configured as described above will be described below.

The RAW developing apparatus determines whether read RAW image data is a RAW image captured by a normal imaging apparatus or a RAW image captured by an imaging element having pupil division pixels (hereinafter also referred to as a "pupil division type imaging element"). The number of bits of RAW image data handled in the first embodiment is set to be 14 bits. Whether the read RAW image data is the RAW image captured by the normal imaging apparatus or the RAW image captured by the pupil division type imaging element can be determined, for example, by analyzing a header of a file. Since a file structure is not essential to the present invention, a description thereof will be omitted. A configuration of the pupil division type imaging element will be described with reference to FIG. 1B.

Figure 1B:
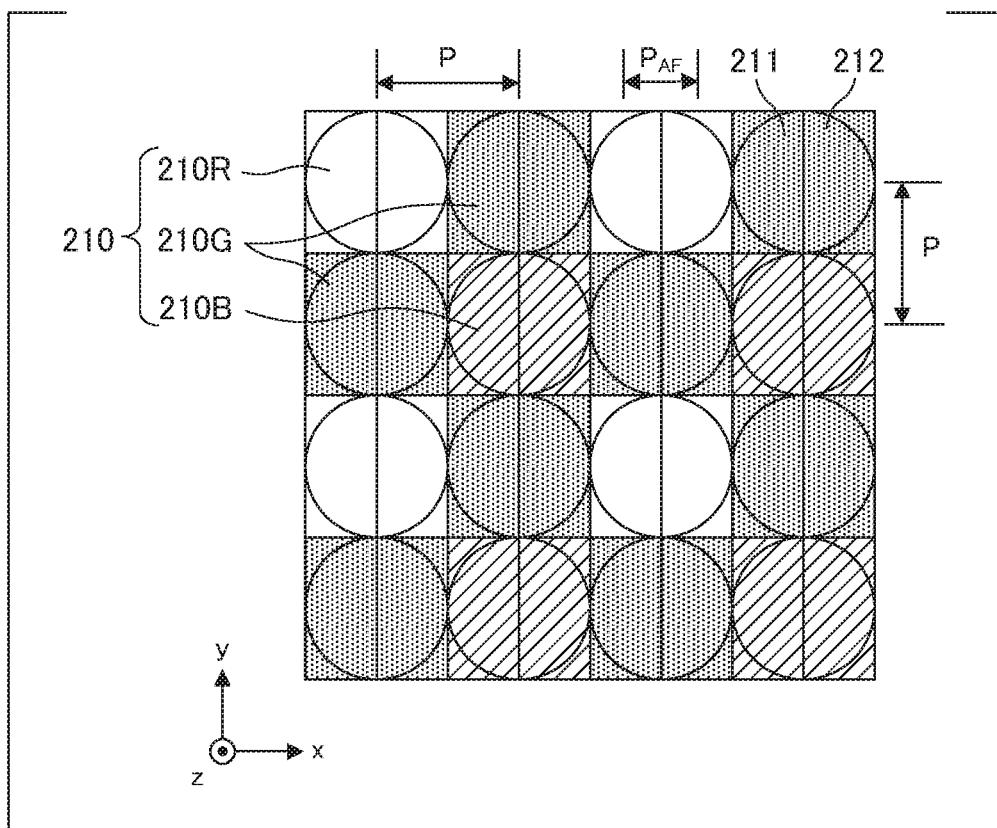

FIG. 1B is a diagram schematically illustrating an arrangement example of pixels in the pupil division type imaging element. A direction which is perpendicular to a paper surface of FIG. 1B is defined as a z direction, a horizontal direction (a rightward or leftward direction) which is orthogonal to the z direction is defined as an x direction, and a vertical direction (an upward or downward direction) which is orthogonal to the x direction and the z direction is defined as a y direction. FIG. 1B illustrates an area in which four pixels are arranged in the x direction and four pixels are arranged in the y direction as an example. The pupil division type imaging element can generate a plurality of image signals from signals based on luminous fluxes passing through different pupil part areas by dividing a pupil area of a photographing optical system in a pupil division direction. To be specific, a photoelectric conversion unit of each pixel is divided into two parts in a horizontal direction (the pupil division direction), and each photoelectric conversion unit functions as a sub-pixel unit. FIG. 1B illustrates an area in which eight sub-pixel units are arranged in the x direction and four sub-pixel units are arranged in the y direction as an example.

A 2 row-and-2 column pixel group 210 at the upper left of FIG. 1B corresponds to a repeat unit of a color filter of a primary color Bayer array provided in an imaging element. Therefore, a pixel 210R with red (R) spectral sensitivity is arranged at an upper left, pixels 210G with green (G) spectral sensitivity are arranged at an upper right and a lower left, and a pixel 210B with blue (B) spectral sensitivity is arranged at a lower right. Furthermore, like the pixel illustrated at the upper right of FIG. 1B as an example, each of the pixels has a photoelectric conversion unit which is equally divided into two halves in the x direction, and the left half of the photoelectric conversion unit can be used as a first sub-pixel unit 211 while the right half of the photoelectric conversion unit can be used as a second sub-pixel unit 212. One image obtained by acquiring an output of the sub-pixel unit 211 and one image obtained by acquiring an output of the sub-pixel unit 212 constitute a set of visual point images. Therefore, two pieces of visual point image data can be generated through one photographing. Furthermore, an additive signal can be used as a pixel signal of one normal pixel on which pupil division is not performed by adding signals obtained by the first sub-pixel unit 211 and the second sub-pixel unit 212 of each of the pixels. In the first embodiment, a circuit of each of the pixels corresponding to each microlens includes a photoelectric conversion unit (a floating diffusion (FD) unit) common to a plurality of pupil-divided photoelectric conversion units. Pixel signals based on electric charges from sub-pixel units and pixel signals obtained by combining and outputting electric charges from the sub-pixel units can be output by controlling the transfer of the electric charge to the FD unit and the reset of the electric charge to the FD unit. For example, an (A+B) image, which has a signal obtained by combining an A image and a B image as optical images based on luminous fluxes passing through different pupil part areas and which are incident on sub-pixel units, with a signal from each of the sub-pixel units can be acquired. Note that a photoelectric conversion unit of each pixel can be divided into any number of parts such as four, nine, or the like.

The RAW developing apparatus 100 performs a display process for a user interface (UI) screen corresponding to a plurality of high brightness gradation improvement processes when read RAW image data is RAW image data captured by the pupil division type imaging element. A display process for the UI screen is performed when the CPU of the control unit 101 executes an application program. A specific example of an image adjustment display screen will be described with reference to FIGS. 2A and 2B.

Figure 2A:
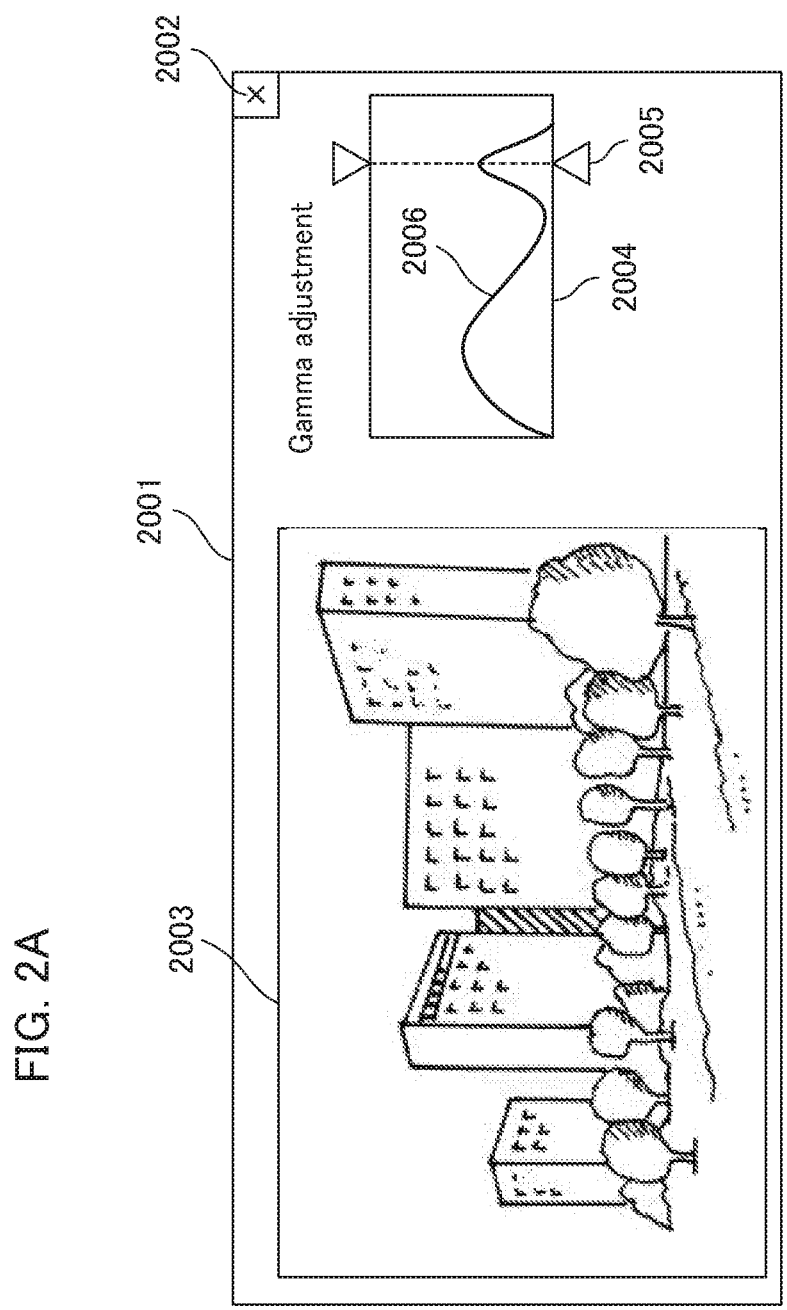

A UI screen 2001 of FIG. 2A is a screen displayed on the display unit 106 after the RAW developing apparatus 100 has read RAW image data captured by the normal imaging apparatus. In the first embodiment, an imaging apparatus which includes imaging units other than the pupil division type imaging element or an imaging apparatus which does not include a plurality of imaging units equivalent to the pupil division type imaging element is assumed to be the normal imaging apparatus. An imaging apparatus which can acquire a plurality of pieces of visual point image data when including a plurality of imaging units equivalent to the pupil division type imaging element is regarded as being equivalent to an imaging apparatus including the pupil division type imaging element. The UI screen 2001 can perform a first high brightness improvement process by moving a white point of an index 2005. A high brightness improvement process is performed when a user moves the index (hereinafter referred to as a "white point (WP) index") 2005 of a white point displayed on a histogram to the right or left. The white point is a point at which values of an R (red) signal, a G (green) signal, and a B (blue) signal are subject to clipping with 14 bits, which is the same as the number of bits as a RAW image in the case in which RAW image data is captured by the normal imaging apparatus.

An operation area 2002 is a close button configured to end the process of the first embodiment. An image 2003 is an image obtained by developing the RAW image captured by the normal imaging apparatus using a white balance (hereinafter also referred to as a "WB") set at a time of photographing. A display area 2004 of FIG. 2A is an area in which a histogram of read image data and the WP index 2005 are displayed. The user can operate a gamma adjustment by moving the WP index 2005 to the right or left. In this case, the WP index 2005 indicates a position of a white point of an image after a developing process. In other words, a position of the WP index 2005 initially displayed indicates a white point when a high brightness gradation improvement process is not performed. The user performs a process of setting the image to be an image in which gradation on a higher brightness side can be expressed, for example, when shifting the WP index 2005 to the right.

A graph 2006 of FIG. 2A corresponds to a histogram corresponding to the displayed image 2003. In the histogram, a horizontal axis indicates brightness (luminance) of the image and a vertical axis indicates a quantity (the number of pixels, a relative frequency, or the like) corresponding to the brightness. The histogram is displayed after an application program is started and data on a high brightness side which can be improved by the high brightness gradation improvement process is displayed in a range which is on a right side of the WP index 2005. The user can grasp that there is room for improvement on the high brightness side at a glance by viewing a histogram to be displayed. In the case of a RAW image captured by the normal imaging apparatus, the UI screen 2001 is presented to the user as a single screen for the high brightness gradation improvement process. Details of the high brightness gradation improvement process will be described below.

A UI screen 2101 of FIG. 2B is a screen displayed on the display unit 106 after the RAW developing apparatus 100 has read a RAW image captured by the pupil division type imaging element. The user can select whether to perform the first high brightness improvement process or perform the high brightness gradation improvement process (hereinafter referred to as a "second high brightness improvement process") using a dynamic extension in the UI screen 2101. Furthermore, the user can instruct a selected high brightness gradation improvement method by operating a WP index 2105. A white point is a point at which values of an R signal, a G signal, and a B signal of a pixel obtained by combining pupil division pixels are subject to clipping with 14 bits, which is the same as the number of bits of a RAW image in the case in which the RAW image is captured by the pupil division type imaging element. A high brightness gradation improvement process of reflecting data exceeding 14 bits at a time at which the signals are developed into an image is performed when the user moves the WP index 2105 to the right. Furthermore, the user performs an operation instruction used to display an area of an image in which high brightness gradation can be improved for each of a plurality of gradation processes by selecting a method for displaying a high brightness gradation improvement area. Details of the second high brightness improvement process will be described below.

In the UI screen 2101 of FIG. 2B, an operation area 2102 is a close button configured to end the process of the first embodiment. An image 2103 is an image obtained by performing developing on a RAW image captured by the pupil division type imaging element with a white balance setting at a photographing time. A display area 2104 is an area in which a histogram of a read image and a white point are displayed, and the user performs an operation for gamma adjustment by moving the WP index 2105 in a rightward or leftward direction. In the case of the WP index 2105 of the image after developing, an initially displayed position of the WP index 2105 indicates a white point when a high brightness gradation improvement process is not performed, and a process of setting the image to be an image in which gradation on a higher brightness side can be expressed is performed by shifting the WP index 2105 to the right. A graph 2106 corresponds to a histogram corresponding to the displayed image 2103. A coordinate setting of the histogram is the same as the graph 2006 of FIG. 2A.

A display area 2107 of FIG. 2B is an area having a radio button used for selecting a high brightness gradation improvement method. Since there are a plurality of high brightness gradation improvement methods in the case of a RAW image captured by the pupil division type imaging element, the user can select a high brightness gradation improvement method using the radio button. When a radio button 2108 is set to be ON, an option in which a pupil division pixel is not used is valid. In this case, a histogram and a WP index corresponding to the high brightness gradation improvement method are displayed on the gamma adjusted display area 2104. The high brightness gradation improvement method when a pupil division pixel is not used is the first high brightness improvement process. On the other hand, when a radio button 2109 is set to be ON, an option in which a pupil division pixel is used is valid. In this case, a histogram and a WP index corresponding to the high brightness gradation improvement method using a pupil division pixel is displayed on the display area 2104 of gamma adjustment. The high brightness gradation improvement method using a pupil division pixel is the second high brightness improvement process.

A checkbox 2110 of FIG. 2B is an operation area used to allow a function of displaying an area on which high brightness gradation improvement is performed using gamma adjustment, in the image 2103. When a check is set to be valid in the checkbox 2110, a high brightness gradation improvement area is displayed in the image 2103 using a method selected through radio buttons 2111 to 2113. When the radio button 2111 is selected, a brightness improvement area is displayed to be distinguished for each high brightness gradation improvement method. When the radio button 2112 is selected, an area in which high brightness can be improved using a high brightness gradation improvement method selected through the radio button 2108 or 2109 of the display area 2107 is displayed. In other words, the user selects a desired high brightness gradation improvement method by operating the radio button 2108 or 2109, and an area in which high brightness gradation can be improved is displayed using the selected method. When the radio button 2113 is selected, an area in which two or more high brightness gradation improvement methods can be used is displayed. In the case of the first embodiment, areas in which high brightness gradation can be improved using the method which uses a pupil division pixel and the method which does not use a pupil division pixel can be displayed. Such settings can be used to confirm a place in which an image quality change can be selected for each high brightness gradation improvement process. Furthermore, when a radio button 2114 is selected, an area in which one or more high brightness gradation improvement methods can be used is displayed. In the case of the first embodiment, an area which can be improved by the method which uses a pupil division pixel and an area which can be improved by the method which does not use a pupil division pixel are displayed without being distinguished from each other. Such a setting can be used so that the user to confirm, whether an area is an area in which high brightness gradation can be improved.

An area 2115 shown in the image 2103 indicates an image area in which high brightness gradation can be improved using the method which uses a pupil division pixel (the second high brightness improvement process). An area 2116 shown in the image 2103 indicates an image area in which high brightness gradation can be improved using the method which does not use a pupil division pixel (the first high brightness improvement process). When the radio button 2111 is selected, an image area in which high brightness gradation can be improved is displayed for each high brightness gradation improvement method, that is, by distinguishing the first and second high brightness improvement processes from each other.

In the first embodiment, it is assumed that a left pixel (FIG. 1B: the first sub-pixel unit 211) is always used as a pupil division pixel. A pixel (an imaging pixel) used to perform capturing using a normal imaging element can be handled to be equal to be a plurality of pupil division pixels by combining the plurality of pupil division pixels. Hereinafter, the pixel obtained by combining the plurality of pupil division pixels will be referred to as a pupil division combination pixel. In an example of FIG. 1B, the pupil division combination pixel corresponds to a pixel obtained by combining right and left pupil division pixels. For this reason, an image obtained through the pupil division combination pixel is an image obtained through a brighter exposure than that of a pupil division pixel.

In the first embodiment, two types of high brightness improvement processes, that is, the first high brightness improvement process which does not use a pupil division pixel and the second high brightness improvement process which uses a pupil division pixel, will be described. An example in which a UI screen for a high brightness gradation improvement process is switched in accordance with a type of image and a UI screen for high brightness gradation improvement of a RAW image captured by the pupil division type imaging element will be described with reference to FIGS. 3 to 6F.

Figure 3:
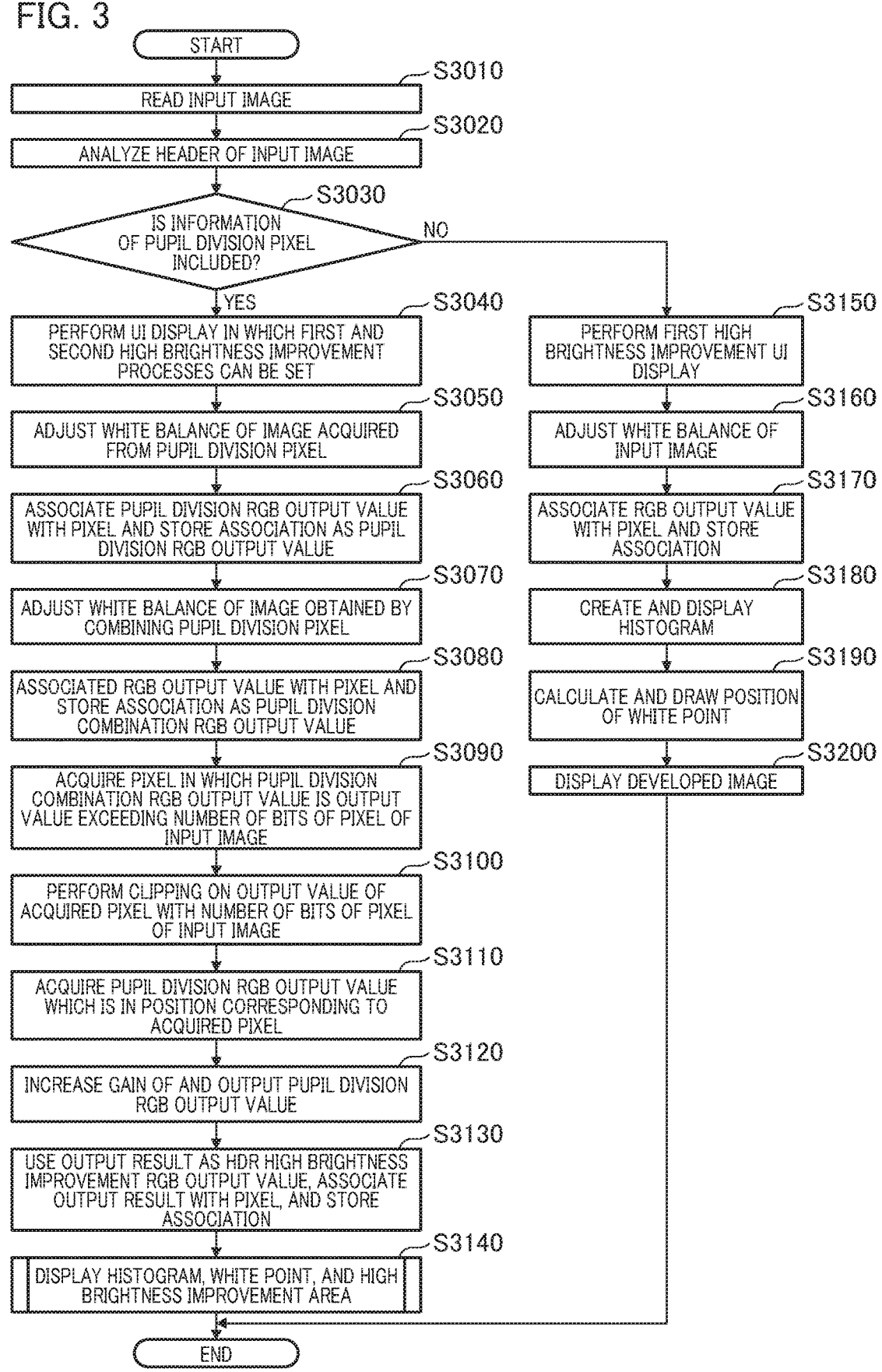
FIG. 3 is a flowchart for describing a process according to the first embodiment.

FIG. 3 is a flowchart for describing a switching process of the UI screen for a high brightness gradation improvement process. The process starts when a user selects a RAW image by operating the operation unit 105 and instructs the operation unit 105 to read the image. The following processes are realized when the CPU of the control unit 101 reads and executes a program from a memory. The program is stored in the read only memory (ROM) 102 as a program code which can be read by the CPU, and for example, the CPU functions as the following units:

a unit configured to switch between UI display screens in accordance with a high brightness gradation improvement method a unit configured to select an adjustment method used for high brightness gradation improvement when there are a plurality of high brightness gradation improvement methods a unit configured to display an adjustment UI display corresponding to an adjustment method used for high brightness gradation improvement a unit configured to switch between displays of an area in which high brightness gradation can be improved.

In S3010, the control unit 101 receives an instruction by the operation unit 105 and reads input image data from the external storage apparatus 104. In S3020, the control unit 101 analyzes a header of an image file read in S3010. In S3030, the control unit 101 determines whether information on a pupil division pixel is included in a RAW image on the basis of the analysis result of S3020. In other words, a determination process concerning whether such information is a RAW image captured by the pupil division type imaging element is performed. Hereinafter, a RAW image captured by the pupil division type imaging element will be referred to as a first RAW image, and a RAW image other than the first RAW image is referred to as a second RAW image. When the control unit 101 determines that the RAW image is the first RAW image, the process moves to a process of S3040. When the control unit 101 determines that the RAW image is the second RAW image, the process proceeds to a process of S3150.

In S3040, the control unit 101 performs a UI display process capable of setting the first and second high brightness improvement processes. The UI screen 2101 of FIG. 2B is displayed on the display unit 106. In S3050, the control unit 101 performs white balance adjustment on an image acquired from a pupil division pixel. In S3060, the control unit 101 acquires an RGB output value which is a result of the WB adjustment of S3050 as a pupil division RGB output value, associates the acquired RGB output value with a pixel, and stores the association in a memory.

In S3070, the control unit 101 performs the WB adjustment on an image obtained by combining pupil division pixels. In S3080, the control unit 101 acquires the RGB output value which is the result of the WB adjustment of S3070 as a pupil division combination RGB output value, associates the acquired RGB output value with a pixel, and stores the association in the memory. In S3090, the control unit 101 acquires a pixel in which the pupil division combination RGB output value acquired in S3080 is an output value exceeding the number of bits of the input image. In the first embodiment, the number of bits of a RAW image is set to be 14 bits. Thus, a pixel having an output value exceeding 14 bits is acquired.

In S3100, the control unit 101 performs clipping on the output value of the pixel which is the acquisition result of S3090 with the number of bits of an input image. In the case of the first embodiment, the clipping is performed with 14 bits. In S3110, the control unit 101 acquires an output value of a pupil division pixel corresponding to the pixel in which the output value has been clipped in S3100. A pupil division pixel is a pixel having lower exposure than the pupil division combination pixel and is dark. For this reason, a pupil division pixel is not clipped even when a pupil division combination pixel is clipped and a high gradation part remains in some cases. The remaining high gradation part is acquired in S3110.

In S3120, the control unit 101 increases gain of the pupil division RGB value acquired in S3110 and outputs the pupil division RGB value. A gain increasing process is performed so that a gain coefficient is set, and thus a pupil division pixel and a pupil division combination pixel have the same exposure state. The output value in S3120 corresponds to a gradation part which can be output by the high brightness gradation improvement process. In S3130, the control unit 101 uses the output value of S3120 as a high dynamic range (HDR) high brightness improvement RGB output value, associates the output value with a pixel, and stores the association in the memory. In S3140, the control unit 101 performs a display process of a histogram, a white point, and a high brightness gradation improvement area. Details of the display process will be described below.

When the process proceeds from the process of S3030 to the process of S3150, that is, when the control unit 101 determines that the input image is the second RAW image, a UI display for the first high brightness improvement process is performed. The UI screen 2001 of FIG. 2A is displayed on the display unit 106. The control unit 101 performs WB adjustment on the input image in S3160, associates an RGB output value, which is the result of the WB adjustment of S3160, with a pixel, and stores the association in the memory in S3170. In S3180, the control unit 101 creates a histogram from the RGB output value acquired in S3170 and displays the histogram on a screen of the display unit 106. The display result is the graph 2006 of FIG. 2A and indicates a histogram corresponding to the displayed image 2003.

In S3190, the control unit 101 calculates a position of a white point in the histogram of S3180 from the RGB output value stored in S3170. The calculated position of the white point is displayed on the display unit 106 using the WP index 2005 of FIG. 2A. A right part relative the position of the white point in the graph 2006 is a part in which the RGB output value exceeds the predetermined number of bits (threshold value) after the adjustment of the white balance. This part represents a place having bits exceeding 14 bits, which is the number of bits of the input image. The first high brightness improvement process is performed by moving the WP index 2005 to the right to change the white point. In S3200, the control unit 101 displays an image which is the result of a developing process in the screen of the display unit 106. The display result is presented to the user as the displayed image 2003 of FIG. 2A. After S3200, the process ends.

Figure 4:
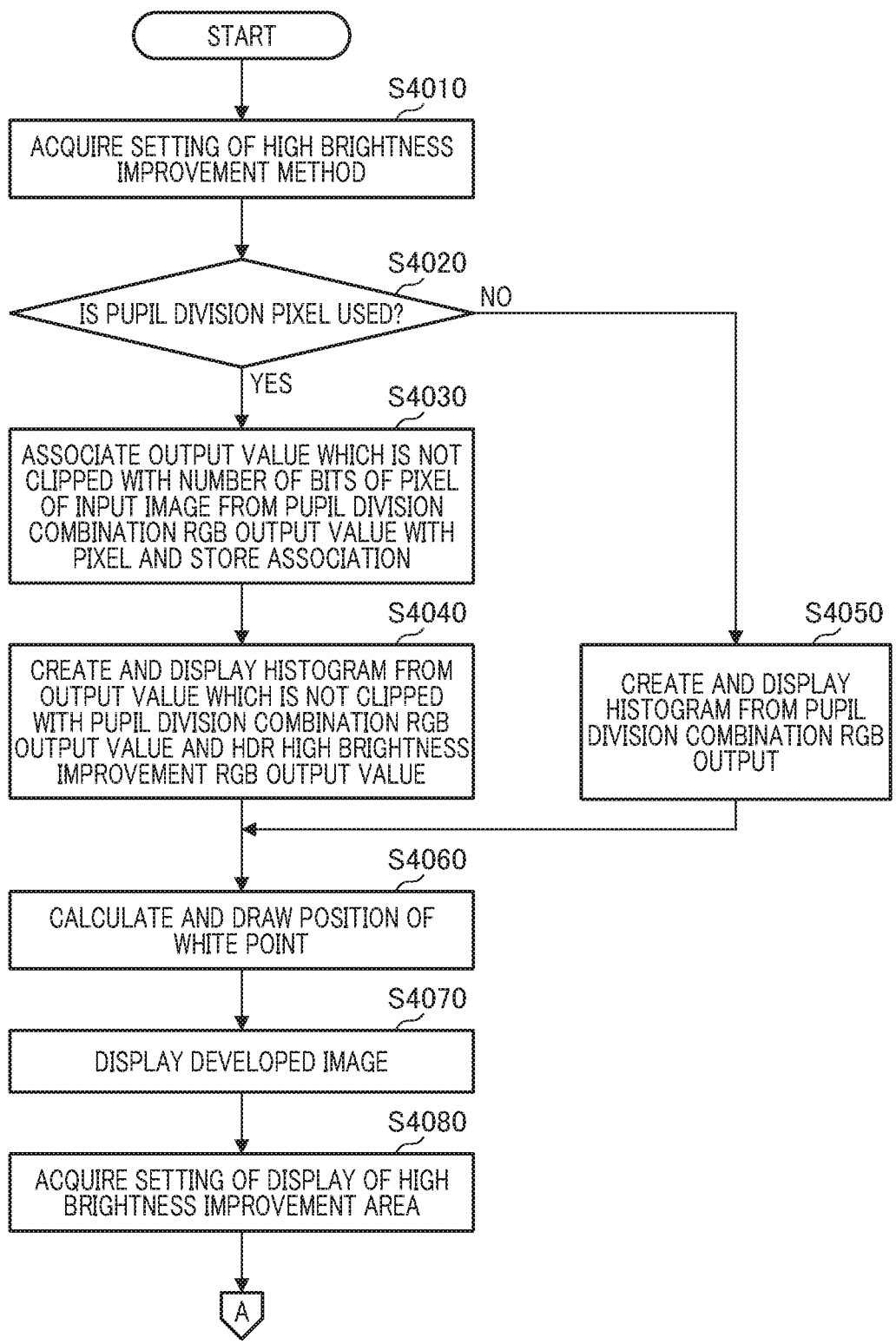
FIG. 4 is a flowchart for describing a display process according to the first embodiment.
Figure 5:
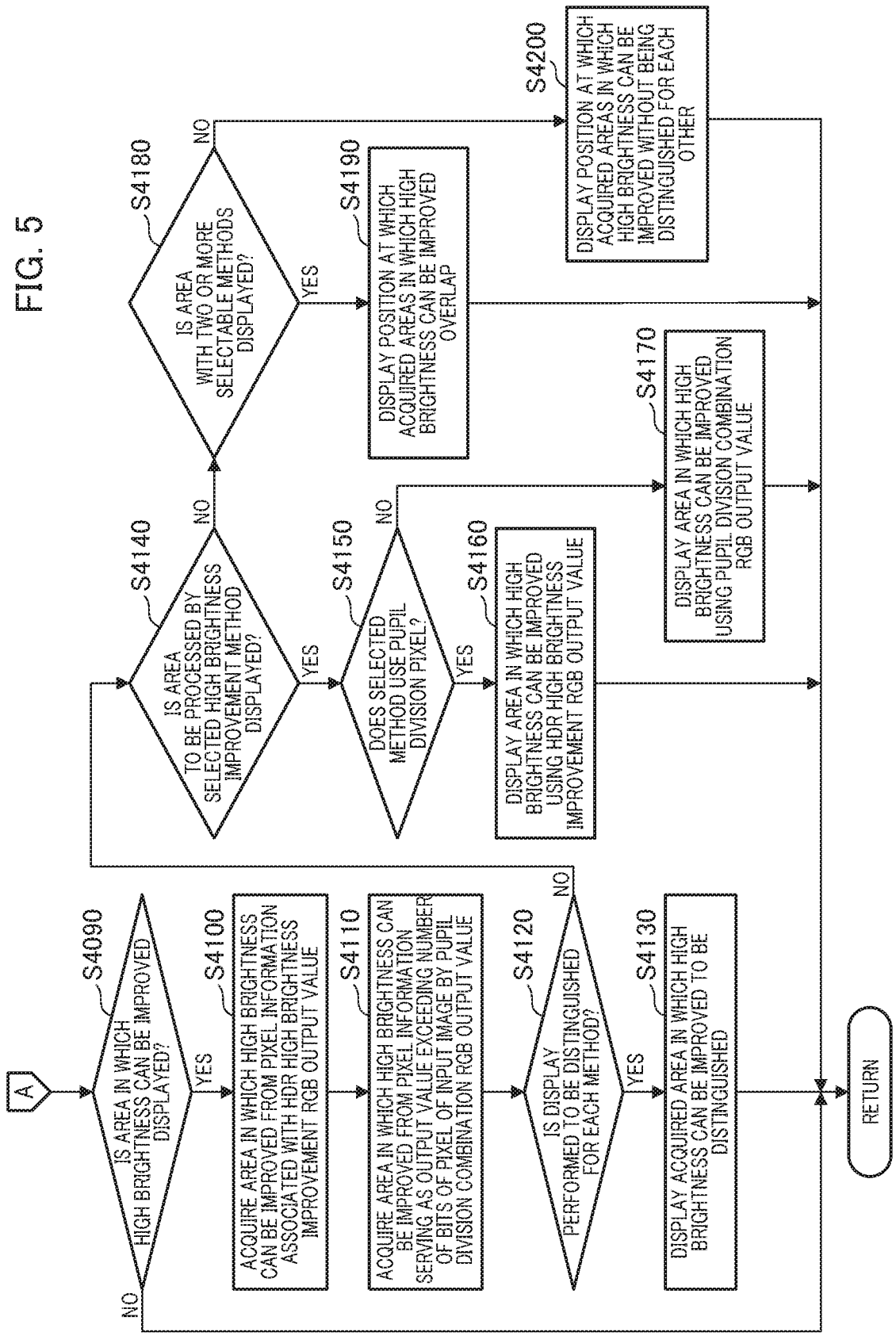
FIG. 5 is a flowchart for describing a process following FIG. 4.

A sub-routine process performed in S3140 of FIG. 3 will be described below with reference to the flowcharts of FIGS. 4 and 5. In S4010, the control unit 101 acquires setting information on the radio buttons 2108 and 2109 of FIG. 2B through an operation of a user with respect to the operation unit 105. In other words, when the user operates any of the radio button 2108 (in which a pupil division pixel is not used) and the radio button 2109 (in which a pupil division pixel is used), information indicating a selected high brightness gradation improvement process method is acquired. In S4020, the control unit 101 determines whether a selection for utilizing a pupil division pixel has been performed on the basis of the setting information of S4010. When it is determined that a process which uses a pupil division pixel (the second high brightness improvement process) has been selected through an ON setting of the radio button 2109, the process proceeds to a process of S4030. Furthermore, when it is determined that a process which does not use a pupil division pixel (the first high brightness improvement process) has been selected through an ON setting of the radio button 2108, the process proceeds to a process of S4050. In an example of the UI screen 2101 of FIG. 2B, the first high brightness improvement process has been selected. The histogram shown in the graph 2106 and a drawing by the WP index 2105 are switched to be a drawing according to a selected method through this selection.

In S4030, the control unit 101 associates an output value, which is not clipped with the number of bits (14 bits) of the input image, with a pixel from the pupil division combination RGB output value acquired in S3080 of FIG. 3 and stores the association in the memory. An output value of a pixel in which a gradation part remains after WB adjustment is performed on an input image which has been subjected to pupil division combination in S3070 is stored. The stored image corresponds to data of a histogram part shown on the left of an initial position of the white point. An output value of a pixel exceeding the number of bits of the input image after the WB adjustment is discarded without being stored.

In S4040, the control unit 101 generates a histogram based on the output value which is not clipped with the pupil division combination RGB output value stored in S4030 and the HDR high brightness improvement RGB output value stored in S3130. The generated histogram is displayed on the screen of the display unit 106. The HDR high brightness improvement RGB output value is an output value obtained by increasing gain of a pupil division RGB output value of a part in which gradation does not remain with the pupil division combination RGB. For this reason, the HDR high brightness improvement RGB output value is an output value in which the part in which gradation does not remain with the output value of the pupil division combination RGB is supplemented. The display result is presented to the user as the graph 2106 of FIG. 2B. The HDR high brightness improvement RGB output value is data of the right part relative to the initial position shown in the WP index 2105. After S4040, the process moves to a process of S4060.

When the process moves from the process of S4020 to the process of S4050, the control unit 101 generates a histogram from the pupil division combination RGB output value stored in S3080 and displays the generated histogram on the screen of the display unit 106. The display result is presented to the user as the graph 2106 of FIG. 2B. An output value which is not clipped with the number of bits of the input image after the WB adjustment is performed on the input image is displayed in the histogram as it is. After that, the process moves to the process of S4060.

In S4060, the control unit 101 performs a process of calculating a position of the white point from the histogram and displaying the calculated position. The display result is presented to the user through the WP index 2105 of FIG. 2B. When the histogram is displayed in S4040, the second high brightness improvement process in which a pupil division pixel is used is performed in the right area of the white point. On the other hand, when the histogram is displayed in S4050, the first high brightness improvement process in which a pupil division pixel is not used is performed in the right area of the white point. In S4070, an image, which is the development result, is displayed on the screen of the display unit 106. In an example illustrated as the image 2103 of FIG. 2B, an area, in which an area in which high brightness gradation can be improved is displayed to be distinguished, is displayed to be superimposed in an image which is the development result.

In S4080, the control unit 101 acquires setting information regarding a display of a high brightness gradation improvement area. Such setting information is information indicating a check state in the checkbox 2110 of FIG. 2B. Information indicating a radio button selected and checked by the user among the radio buttons 2111, 2112, 2113, and 2114 in the checkbox 2110 is acquired. Subsequently, the process moves to a process of S4090 of FIG. 5, and the control unit 101 determines whether a check has been performed with respect to the checkbox 2110. When it is determined that a check has been performed, the process proceeds to a process of S4100, and when it is determined that a check has not been performed, the sub-routine process ends.

In S4100, the control unit 101 acquires data of an area which can be improved by the second high brightness improvement process. At this time, pixel information associated with the HDR high brightness improvement RGB output value stored in S3130 is used. The area acquired in S4100 is a first, image area corresponding to the area 2115 shown in the image 2103 of FIG. 2B. In S4110, the control unit 101 acquires data of an area which can be improved by the first high brightness improvement process. At this time, pixel information having an output value exceeding the number of pixel bits of the input image by the pupil division combination RGB output value acquired in S3090 is used. The area acquired in S4110 is a second image area corresponding to the area 2116 shown in the image 2103 of FIG. 2B.

In S4120, the control unit 101 determines whether the radio button 2111 of FIG. 2B is selected from the setting information acquired in S4080. An ON setting of the radio button 2111 corresponds to an option of displaying areas to be distinguished from each other for each method. In other words, when a selection is performed to display the areas to be distinguished from each other for each method, the process proceeds to a process of S4130, and when such a selection is not performed, the process proceeds to a process of S4140. In S4130, the control unit 101 performs a process of displaying a first area acquired in S4100 and a second area acquired in S4110 in an image to be distinguished from each other. The area 2115, which can be improved by the second high brightness improvement process, and the area 2116, which can be improved by the first high brightness improvement process, can be displayed on the display screen to be distinguished from each other. Although a method of displaying the areas to be distinguished from each other using shading in which the areas are display to be shaded is performed in the first embodiment, any display method can be adopted, and the areas may be distinguished through a method of displaying the areas using color codes.

In S4140, the control unit 101 determines whether the radio button 2112 of FIG. 2B is selected from the setting information acquired in S4080. An ON setting of the radio button 2112 corresponds to an option of displaying the areas using the method selected at the current time. When the radio button 2112 is selected, the process proceeds to a process of S4150, and when the radio button 2112 is not selected, the process proceeds to a process of S4180.

In S4150, the control unit 101 determines whether the radio button 2109 of FIG. 2B is selected from the setting information acquired in S4080. The ON setting of the radio button 2109 corresponds to an option using a pupil division pixel. When the radio button 2109 is selected, the process proceeds to a process of S4160, and when the radio button 2109 is not selected, the process proceeds to a process of S4170. In S4160, the control unit 101 performs a method which uses the pupil division pixel acquired in S4100, that is, a process of displaying an area which can be improved by the second high brightness improvement process. Only the area 2115 of FIG. 2B is displayed as such an area. On the other hand, in S4170, the control unit 101 performs a method which does not use the pupil division pixel acquired in S4110, that is, a process of displaying an area which can be improved by the first high brightness improvement process is performed. Only the area 2116 of FIG. 2B is displayed as such an area.

In S4180, the control unit 101 determines whether the radio button 2113 of FIG. 2B is selected from the setting acquired in S4080. An ON setting of the radio button 2113 corresponds to an option of displaying an area in which two or more methods can be used. When the radio button 2113 is selected, the process proceeds to a process of S4190, and when the radio button 2113 is not selected, the process proceeds to a process of S4200. When the process proceeds to the process of S4200 based on the determination results of S4120, S4140, and S4180, the radio button 2114 is selected in some cases. An ON setting of the radio button 2114 corresponds to an option of displaying an area in which one or more methods can be used.

In S4190, the control unit 101 performs a process of displaying areas in which two types of high brightness gradation can be improved based on the determination result of S4180. The area which can be improved by the second high brightness improvement process acquired in S4100 corresponds to the area 2115 of FIG. 2B. Furthermore, the area which can be improved by the first high brightness improvement process acquired in S4110 corresponds to the area 2116 of FIG. 2B. A superimposed area of the two areas is displayed.

In S4200, the control unit 101 performs a process of displaying one or more areas in which high brightness gradation can be improved based on the determination results of S4140 and S4180. In this case, the area 2115 of FIG. 2B, which can be improved by the second high brightness improvement process, and the area 2116 of FIG. 2B, which can be improved by the first high brightness improvement process, are displayed without being distinguished from each other. After the processes of S4130, S4160, S4170, and S4200, the sub-routine process ends.

Figure 6A:
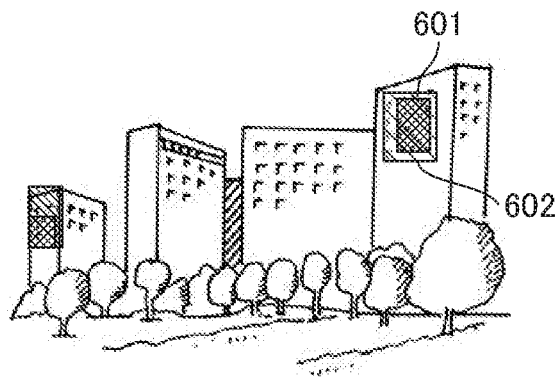
FIGS. 6A to 6F are diagram for describing an example of display processing according to the first embodiment.
Figure 6B:
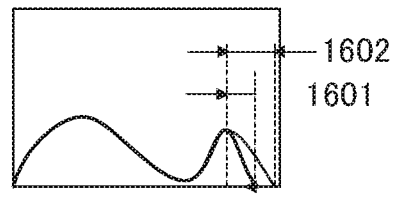
Figure 6C:
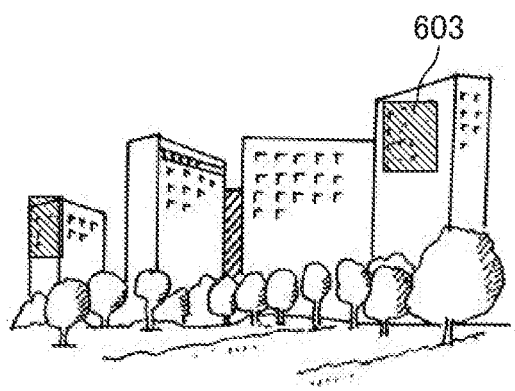
Figure 6D:
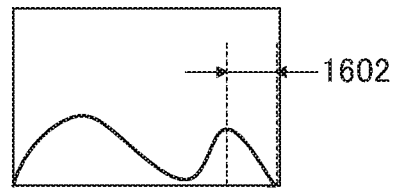
Figure 6E:
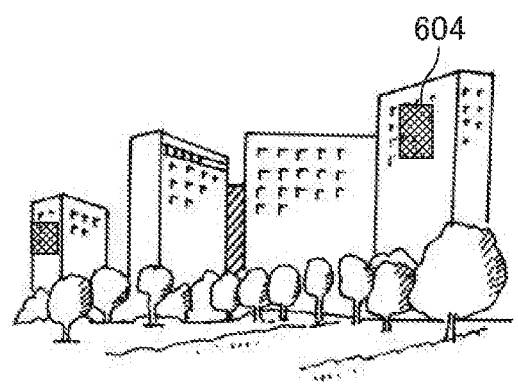
Figure 6F:
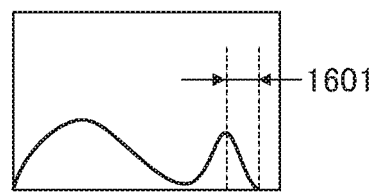

A specific example regarding a display process of an image area in which high brightness gradation can be improved and a histogram will be described with reference to FIGS. 6A to 6F. FIGS. 6A, 6C, and 6E illustrate image examples and FIGS. 6B, 6D, and 6F illustrate histograms corresponding to the image examples. FIGS. 6A and 6B illustrate a case in which an area on which gradation adjustment can be performed on a high brightness side thereof is displayed to be distinguished for each high brightness gradation improvement method. In an image of FIG. 6A, a first area 601 indicates an area in which adjustment is possible using a first high brightness improvement method. A second area 602 indicates an area in which adjustment is possible using a second high brightness improvement method. The first area 601 and the second area 602 can be visually distinguished and recognized by the user. In a high brightness area of the histogram shown in FIG. 6B, an area 1602 in which adjustment is possible using the second high brightness improvement method is larger than an area 1601 in which adjustment is possible using the first high brightness improvement method.

FIGS. 6C and 6D illustrate a case in which an area on which gradation adjustment can be performed on a high brightness side thereof is displayed without being distinguished for each high brightness gradation improvement method. An area 603 shown in the image of FIG. 6C indicates an area on which adjustment can be performed using the first or second high brightness improvement method. In other words, the area 603 corresponds to an area obtained by performing a logical sum (OR) operation on two areas in which adjustment is possible. In this case, it is impossible for the user to visually distinguish differences of the area 603 due to the high brightness gradation improvement method. The area 1602 shown in the high brightness area of the histogram shown in FIG. 6D is an area on which adjustment can be performed using the second high brightness improvement method.

FIGS. 6E and 6F illustrate a case in which an area obtained by superimposing two areas using the high brightness gradation improvement method is displayed as an area on which gradation adjustment can be performed on a high brightness side thereof. An area 604 shown in the image of FIG. 6E is an area obtained by superimposing an area on which adjustment can be performed using the first high brightness improvement method and an area on which adjustment can be performed using the second high brightness improvement method. In other words, the area 604 corresponds to an area obtained by performing a logical product (AND) operation on the two areas on which adjustment can be performed. It is impossible for the user to visually distinguish differences of the area 604 due to the high brightness gradation improvement method. The area 1601 shown in the high brightness area of the histogram shown in FIG. 6F is an area on which adjustment can be performed using the first high brightness improvement method.

According to the first embodiment, an image processing apparatus and an image process method capable of adaptively performing a gradation process when there are a plurality of distributions of a high-brightness-side gradation which can be reflected at a developing time can be provided. Note that an example in which, when a user selects a high brightness gradation improvement method which can be applied to one image, each histogram operated by a high brightness improvement process (a gradation process) is switched has been described in the first embodiment, but the present invention is not limited thereto. In addition, each histogram for each high brightness gradation improvement method is superimposed and displayed on the screen, and an image processing apparatus may be configured to automatically select an optimal high brightness gradation improvement process in accordance with a setting value of a white point, the occurrence of a false color or noise due to a process, or the like. Furthermore, when the user automatically selects an optimal high brightness gradation improvement method at a desired position of a white point, a notification area used to display the selected result may be provided in the UI screen. A high brightness gradation improvement method which can be applied to one image is not limited to being one of two types of methods, and the present invention can be applied even when there are three or more types of high brightness gradation improvement methods.

Second Embodiment

A second embodiment of the present invention will be described below.

There is a method of performing a dynamic range extension process of a high brightness area using images simultaneously captured using a pupil division type imaging element and having different exposures. This method is likely to increase noise because a process of increasing gain is performed on a low exposure image such that gradation for a high brightness area may be expressed. Furthermore, there is a method of performing developing without losing gradation of a high brightness area by calculating a saturation level of each color signal of each pixel used for performing imaging and comparing the saturation level of each of the color signals to replace a pixel value. This method is likely to generate coloring or the like of an image after developing if estimation accuracy is low when estimating the pixel value. In the second embodiment, an image processing apparatus capable of performing a dynamic range extension process while minimizing an increase in nose or coloring will be described.

Figure 7:
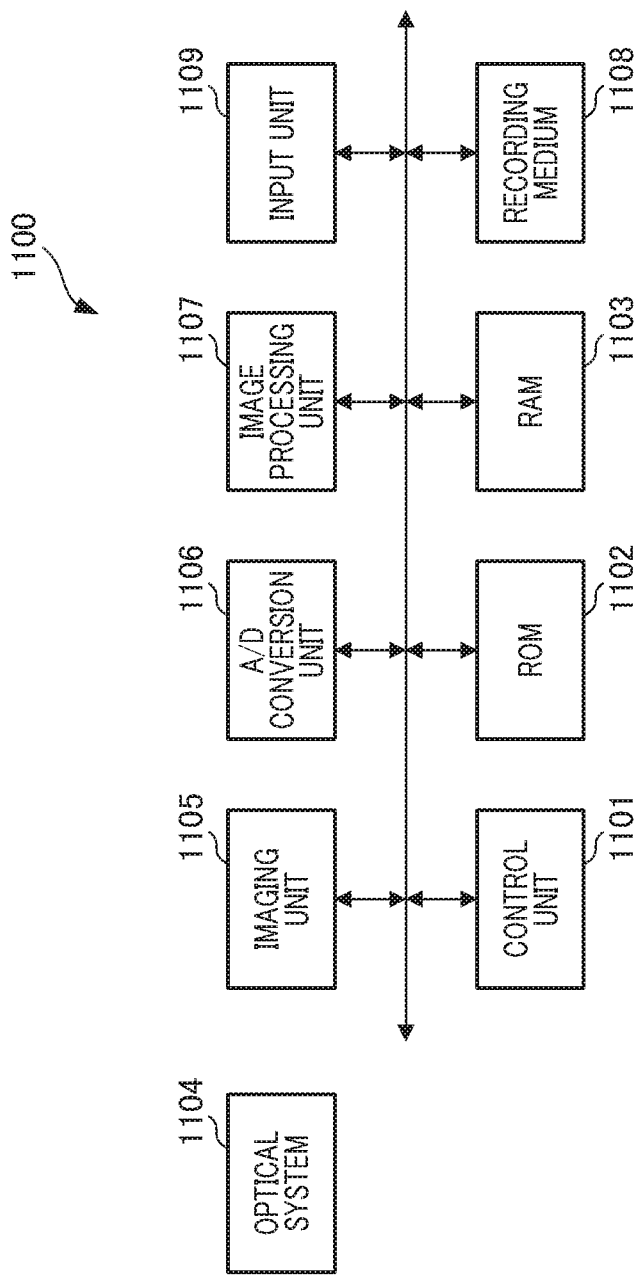
FIG. 7 is a block diagram showing a functional configuration of an imaging apparatus according to a second embodiment.

FIG. 7 is a block diagram showing a functional configuration when the image processing apparatus according to the second embodiment is applied to a digital camera 1100. The control unit 1101 includes a CPU. Such a CPU reads an operation program of each block included in the digital camera 1100 from a ROM 1102 and controls an operation of each constituent element included in the digital camera 1100 by developing and executing an operation program in a RAM 1103. The ROM 1102 is a rewritable nonvolatile memory and stores an operation program for each constituent element and parameters required for operation thereof. The RAM 1103 is a rewriteable volatile memory and is used as a temporary storage area for data output during the operation of each of the constituent elements.

An optical system 1104 is an imaging optical system configured to form an image of light from an object on an imaging unit 1105. The imaging unit 1105 includes an imaging element such as a charge coupled device (CCD) type image sensor or complementary metal oxide semiconductor (CMOS) type image sensor. The imaging element according to the second embodiment is a pupil division type imaging element and includes a plurality of microlenses and a plurality of photoelectric conversion units corresponding to the microlenses. A main pixel arranged below one microlens is constituted of a plurality of sub-pixels configured to receive light passing through different pupil areas of the optical system 1104. For example, when the main pixel is constituted of a photoelectric conversion unit divided in two, one main pixel is constituted of two sub-pixels. In the second embodiment, it is assumed that shutter seconds at a time of capturing images have the same setting in each sub-pixel.

The imaging unit 1105 outputs an analog image signal, which is obtained by photoelectrically converting an optical image formed through the imaging optical system, to an analog/digital (A/D) conversion unit 1106. The A/D conversion unit 1106 performs an A/D conversion process on the input analog image signal and outputs and stores an acquired digital image data to and in the RAM 1103.

An image processing unit 1107 performs a predetermined image process (a developing process, a correction process, or the like) on image data stored in the RAM 1103. A recording medium 1108 is a removable memory card or the like. Image data which has been processed by the image processing unit 1107, image data which has been subjected to A/D conversion by the A/D conversion unit 1106, or the like stored in the RAM 1103 is stored in the recording medium 1108. An input unit 1109 includes an operation member, a touch panel, or the like, receives an operation instruction by a user, and transmits an operation instruction signal to the control unit 1101.

Figure 8:
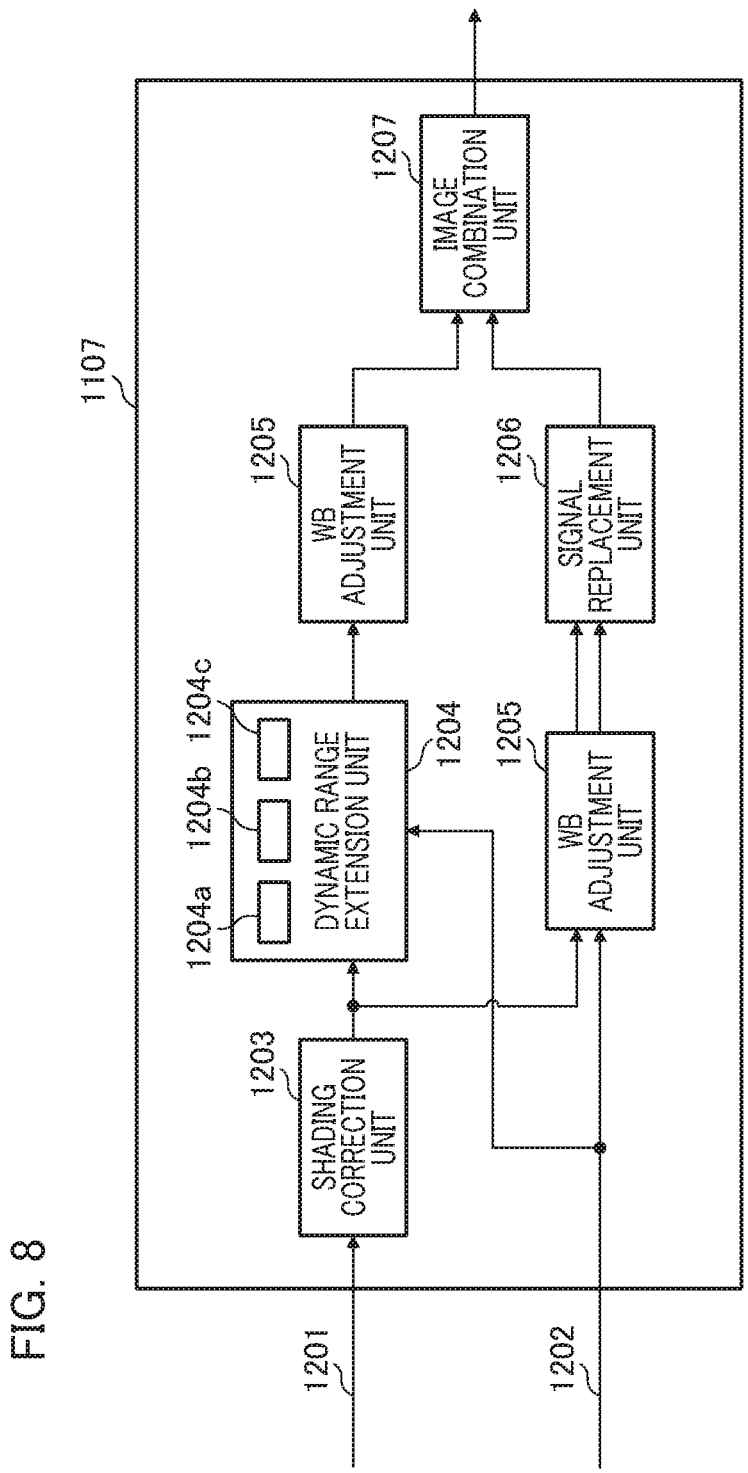
FIG. 8 is a diagram for describing a configuration of an image processing unit according to the second embodiment.
Figure 9:
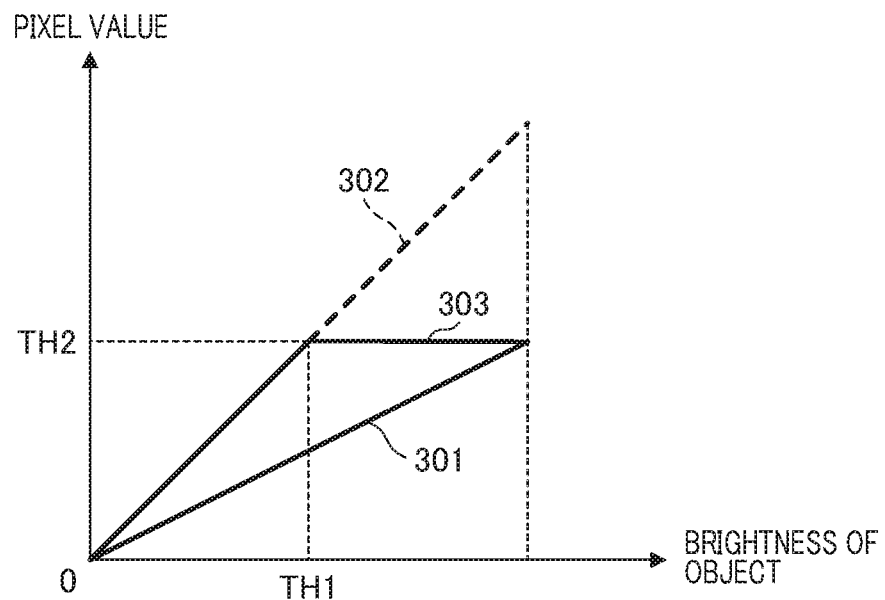
FIG. 9 is a diagram for describing an operation of an image combination unit of FIG. 8.
Figure 10:
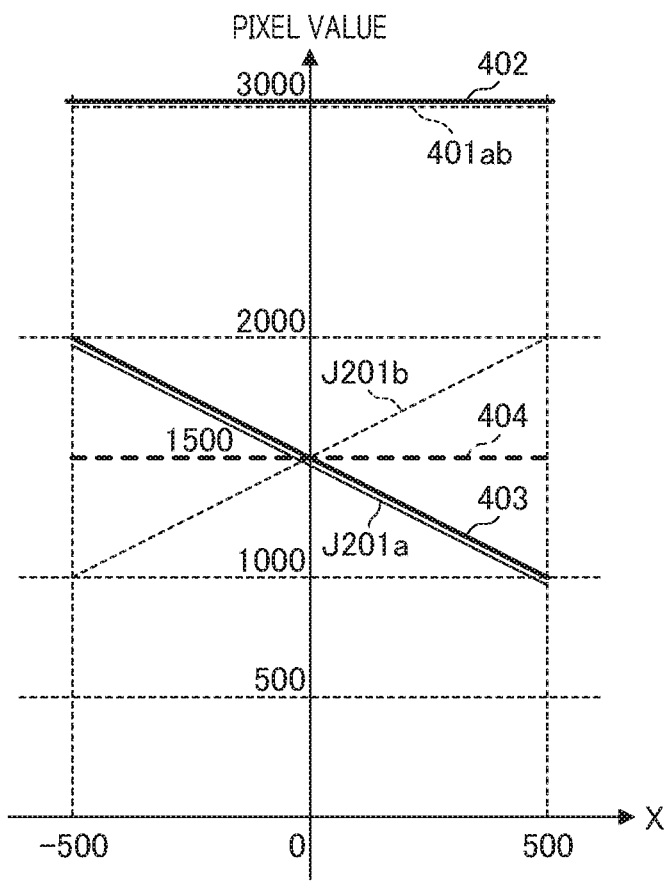
FIG. 10 is a diagram for describing the operation of the image processing unit according to the second embodiment.

An image process according to the second embodiment will be described in detail below. FIG. 8 is a block diagram illustrating an example of a configuration of the image processing unit 1107. FIG. 9 is a diagram for describing an image combination process according to the second embodiment. FIG. 10 is a diagram for describing an operation of the image processing unit 1107. First, an input image acquired by the imaging unit 1105 will be described with reference to FIG. 10.

FIG. 10 is a diagram for describing a procedure of acquiring images with two different exposures. A horizontal axis X indicates a pixel position, and a vertical axis indicates a pixel value. A pixel arrangement of the pupil division type imaging element included in the imaging unit 1105 is as illustrated in FIG. 1B and is described in the first embodiment, and each piece of image data of an A image, a B image, and an (A+B) image can be acquired using a plurality of photoelectric conversion units. In FIG. 10, a graph line J201a indicates a pupil division image (the A image), a graph line J201b indicates a pupil division image (the 16 image), and a graph line 401ab indicates the (A+B) linage. There are two methods for acquiring a pupil division image which can be applied to the present invention:

(1) a first method for acquiring the A image and the B image and generating the (A+B) image (2) a second method for acquiring the A image (or the B image) and the (A+B) image and generating the B image (or the A image).

In the first method, for example, a non-additive read mode for focus detection is set and data of the A image and the B image are independently read from the imaging unit 1105 in the same exposure state. The image processing unit 1107 adds the data of the A image and the B image and generates the (A+B) image with a higher exposure state.

In the second method, for example, the data of the A image and the (A+B) image are independently read from the imaging unit 1105. A case in which the A image is read and then the B image is read in the non-additive read mode is assumed. In this case, a reset command for a floating diffusion (FD) area is not issued immediately before the B image is read so that the signal of the A image and a signal of the B image can be added when the signal of the B image is transferred to the FD area. Thus, the (A+B) image can be read in place of the B image. Since data of the (A+B) image is obtained by pixel level signal addition, the data of the (A+B) image is not affected by amplifier noise at an addition time. An image with a high signal-to-noise (S/N) ratio which cannot be obtained when an A/D converted image is added can be obtained.

Since the A image is an image in which an aperture of a pixel is underexposed by one stage less than that of the (A+B) image, the image processing unit 1107 combines the A image and the (A+B) image and performs a dynamic range extension process. Thus, a dynamic range extension effect for one stage can be obtained. In FIG. 10, the A image indicated by the graph line J201a is set to be an underexposed image 403 and the (A+B) image indicated by the graph line 401ab is set to be a properly exposed image 402. A corrected underexposed image 404 is generated by performing shading correction on the underexposed image 403. In the second embodiment, the generated A image and (A+B) image are used as input images.

Figure 11:
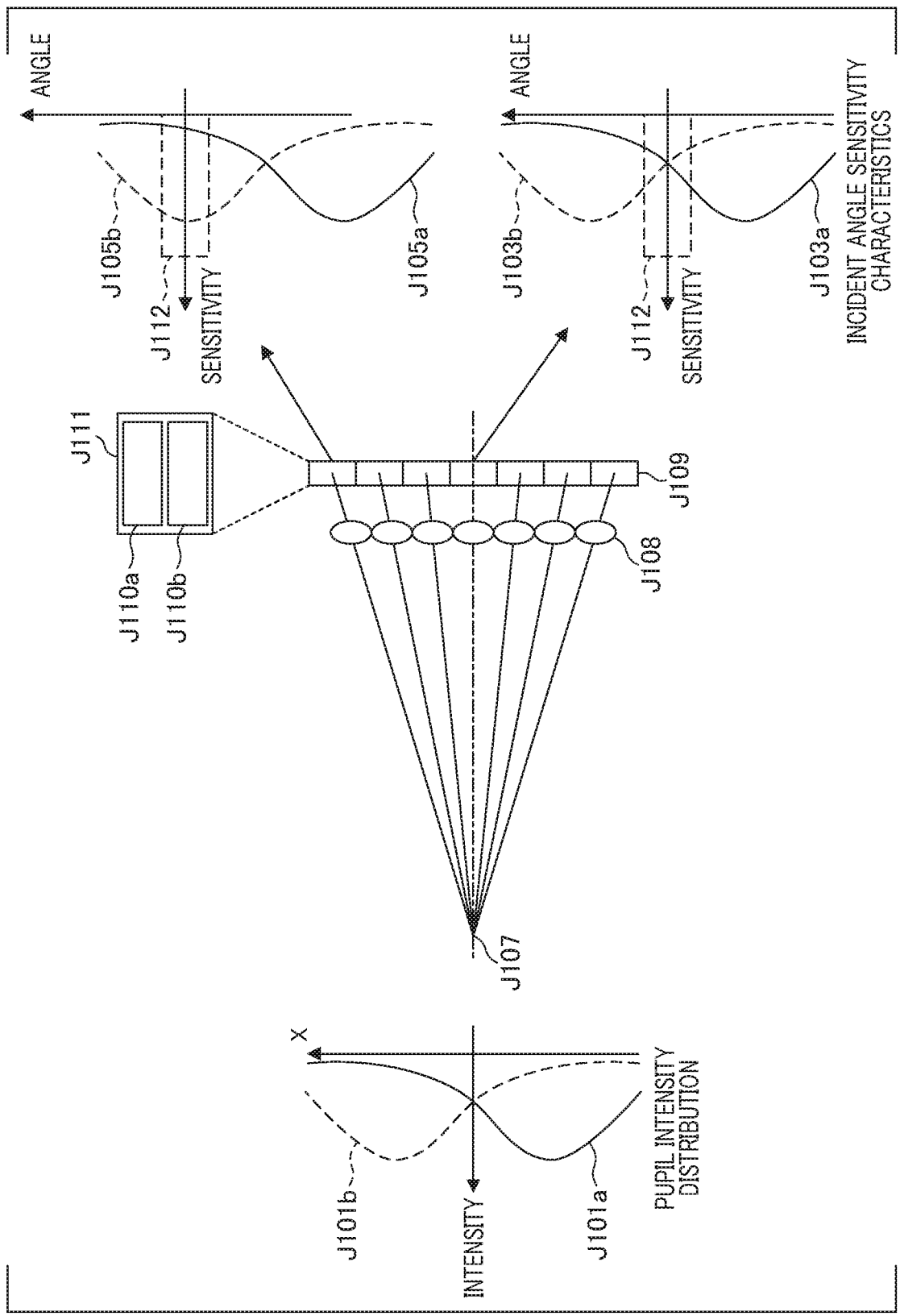
FIG. 11 is a diagram for describing a pupil intensity distribution and incident angle sensitivity characteristics of an imaging element.

In the second embodiment, control is performed to switch a plurality of dynamic range extension processes in accordance with photographing conditions. A first DR extension process will be described with reference to FIGS. 11 to 16B. FIG. 11 is a diagram for describing a pupil intensity distribution in a sensor pupil plane and incident angle sensitivity characteristics in an image plane of an imaging element (a sensor). Different pupil intensity distributions for every pupil division image acquired from a plurality of sub-pixels, and shading characteristics based on thereon will be described in detail.

An example of a pupil intensity distribution is illustrated on the left side, a schematic diagram of an imaging optical system is illustrated at the center, and an example of characteristics of incident angle sensitivity is illustrated on the right side in FIG. 11. In the central diagram, a sensor pupil plane J107, a microlens array J108, and a pixel array J109 are arranged in order from the left side. A main pixel J111 constituting an imaging element is constituted of a sub-pixel J110a and a sub-pixel J110b. The sub-pixel J110a corresponds to a pixel of the A image and the sub-pixel J110b corresponds to a pixel of the B image. In the pupil intensity distribution, an X axis indicates a pixel position, and a pupil intensity distribution of the sub-pixel J110a is a graph line J101a indicated by a solid line while a pupil intensity distribution of the sub-pixel J110b is a graph line J101b indicated by a dotted line due to vignetting of a pupil.

Incident angle sensitivity characteristics at the center of an image plane corresponding to the graph lines J101a and J101b indicating the pupil intensity distributions are indicated by graph lines J103a and J103b. The incident angle sensitivity characteristics are characteristics representing the sensitivity to an angle axis. The graph line J103a indicates the incident angle sensitivity characteristics of the sub-pixel J110a, and the graph line J103b indicates the incident angle sensitivity characteristics of the sub-pixel J110b. An area J112 is an angular area of incident light restricted by a diaphragm or the like. Amounts of light incident on the sub-pixels J110a and J110b are the same at the center of the image plane.

Also, incident angle sensitivity characteristics at an end of the image plane corresponding to the graph lines J101a and J101b indicating the pupil intensity distributions are indicated by graph lines J105a and J105b. The graph line J105a indicates the incident angle sensitivity characteristics of the sub-pixel J110a, and the graph line J105b indicates the incident angle sensitivity characteristics of the sub-pixel J110b. Since imaging positions are different between the end of the image plane and the center of the image plane, the incident angle sensitivity characteristics at the end of the image plane have a profile which is eccentric with respect to the center of the image plane. For this reason, at the end of the image plane, an amount of light incident on the sub-pixel J110b is larger than an amount of light incident on the sub-pixel J110a.

Figure 12:
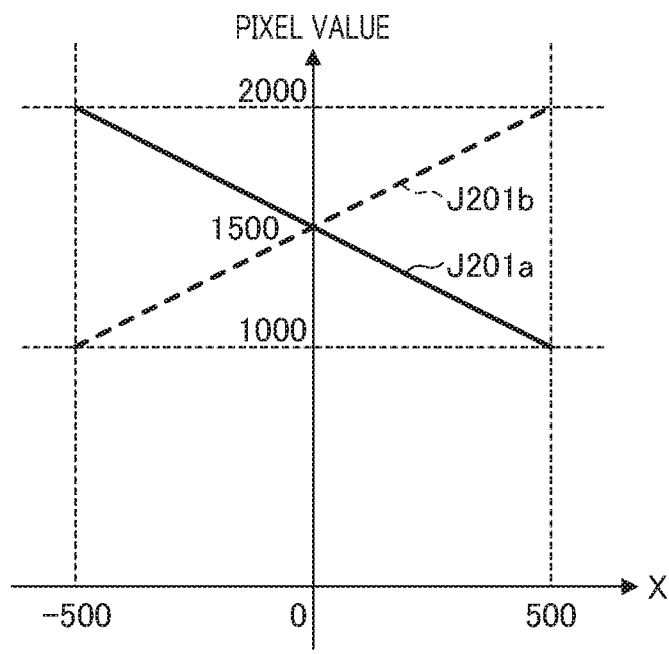
FIG. 12 is a diagram for describing shading characteristics.

The shading characteristics will be described with reference to FIG. 12. A horizontal axis X indicates a pixel position on an image plane, and a vertical axis indicates a pixel value. In the shading characteristics of FIG. 12, the graph line J201a indicates shading characteristics of the sub-pixel J110a and the graph line J201b indicates shading characteristics of the sub-pixel J110b. A position of the center of the image plane of FIG. 11 corresponds to X=0 in FIG. 12, and a position of the end of the image plane of FIG. 11 corresponds to X=500 in FIG. 12.

Figure 13:
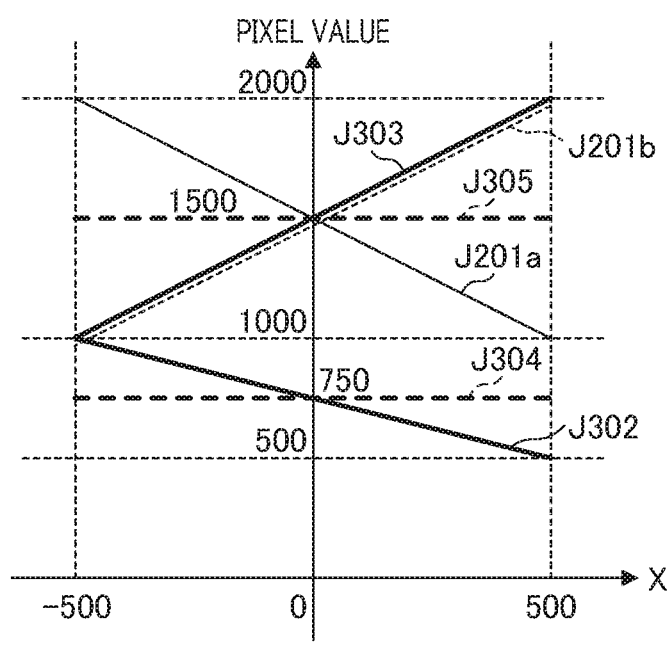
FIG. 13 is a diagram for describing an acquisition of two images with different exposures.

FIG. 13 is a diagram for describing a process of acquiring a plurality of images with different exposures for different pupil division images acquired by the sub-pixels J110a and J110b of FIG. 11. The setting of the coordinate axes is the same as in FIG. 12. A graph line J303 indicates a pupil division image when imaging is performed with the sub-pixel J110*b* being subjected to proper exposure. A pupil division image captured with the sub-pixel J110*a* being subjected to one stage (1EV) underexposure is indicated by a graph line J302. Shading correction is performed by multiplying images and a shading correction coefficient based on inverse characteristics of the shading characteristics of FIG. 12. In other words, J303 is corrected like J305, and J302 is corrected like J304.

Figure 14:
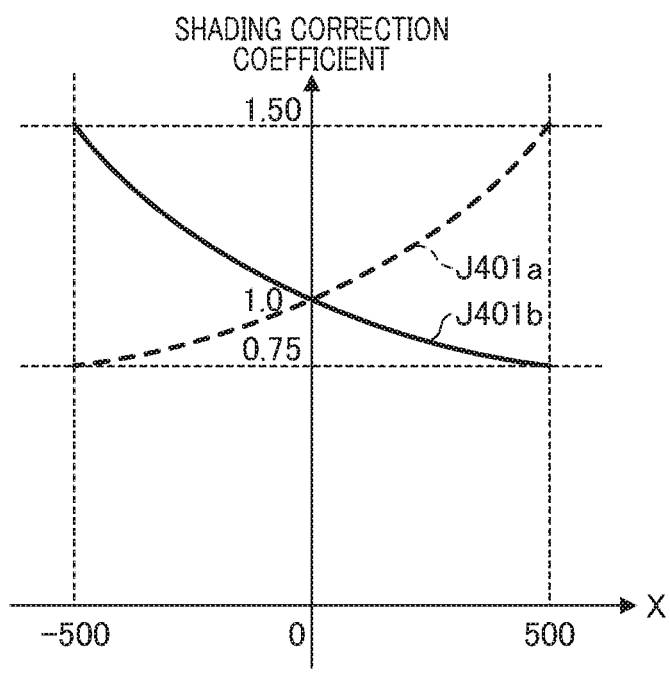
FIG. 14 is a diagram for describing a shading correction coefficient.

FIG. 14 exemplifies a shading correction coefficient. A horizontal axis X indicates a pixel position, and a vertical axis indicates a shading correction coefficient value. A graph line J401*a* is applied to the pupil division image of the sub-pixel J110*a* and a graph line J401*b* is applied to the pupil division image of the sub-pixel J110*b*. Finally, in FIG. 13, a properly exposed image indicated by a graph line J305 and an underexposed image indicated by a graph line J304 are obtained. In addition, an exposure difference corresponding to one stage (corresponding to 1 EV) over the entire image plane can be obtained. After different pupil division images are subjected to shading correction, a dynamic range extension combination process is performed.

A configuration and an operation of the image processing unit 1107 associated with a first DR extension process will be described below with reference to FIGS. 8 to 10. First image data 1201 (FIG. 8) acquired by an underexposed image input unit corresponds to an underexposed image (a pupil division image corresponding to the A image or the B image) acquired from one sub-pixel between the sub-pixels J110*a* and J110*b* (FIG. 11). Furthermore, second image data 1202 (FIG. 8) acquired by a properly exposed image input unit is properly exposed image data obtained by adding image data acquired from the sub-pixel J110*a* and image data acquired from the sub-pixel J110*b*.

A shading correction unit 1203 of FIG. 8 corrects uneven brightness due to an amount of uneven vignetting of a divided pupil. For example, shading correction is performed by multiplying data of an underexposed image (a graph line 403) of FIG. 10 and the shading correction coefficient (the graph line J401*a*) of FIG. 14. Data of a shading correction coefficient used for such shading correction is read from the ROM 1102 of FIG. 7.

A dynamic range extension unit (hereinafter referred to as a "DR extension unit") 1204 of FIG. 8 performs a DR extension process to combine a corrected underexposed image (a graph line 404) and a properly exposed image (a graph line 402) of FIG. 10. In other words, a combination image in which a gradation expression range is expanded is generated. The DR extension unit 1204 generates the combination image by combining the corrected underexposed image (specifically, an underexposed image with increased gain which will be described below) and a properly exposed image 402 in accordance with brightness of an object. A specific example will be described with reference to FIG. 9.

FIG. 9 is a diagram for describing an operation of the DR extension unit 1204. A vertical axis indicates a pixel value, and a horizontal axis indicates brightness of an object. The brightness of the object can be obtained by referring to, for example, a pixel value of a shading-corrected underexposed image. A graph line 301 indicates a corrected underexposed image, and a graph line 303 indicates a properly exposed image. A threshold value TH2 corresponds to a saturation level of a pixel. When the imaging unit 1105 captures a bright object with proper exposure, a pixel value is clipped at the threshold value TH2. A threshold value TH1 indicates brightness of an object corresponding to the threshold value TH2. A graph line 302 indicated by a dotted line indicates an underexposed image after the corrected underexposed image (the graph line 301) has gain thereof increased by one stage. A corrected underexposed image is an image with exposure lower than proper exposure by one stage, and brightness thereof can be matched with that of a properly exposed image 303 through gaining-up of one stage.

The DR extension unit 1204 performs the following process for each area by comparing a corrected underexposed image (the graph line 301) with a properly exposed image (the graph line 303):

an arithmetic process of calculating an amount of shift from the most similar pixel position using a difference absolute value sum or the like on the basis of brightness
a process of performing positioning using the calculated amount of shift.

A position correction unit 1204*a* shown in the DR extension unit 1204 of FIG. 8 performs a positioning process using the calculated amount of shift. A determination unit 1204*b* compares brightness of an object in a predetermined pixel position with a threshold value (FIG. 9: TH1). The determination unit 1204*b* determines whether the brightness of the object in the predetermined pixel position is the threshold value or more and outputs the determination result to a selection unit 1204*c*. The selection unit 1204*c* selects either the corrected underexposed image (the graph line 301) or the properly exposed image (the graph line 303) in accordance with the determination result of the determination unit 1204*b*. In other words, the selection unit 1204*c* selects the properly exposed image when the brightness of the object is less than the threshold value and selects the corrected underexposed image when the brightness of the object is the threshold value or more. Moreover, the DR extension unit 1204 performs a gain increasing process on the corrected underexposed image 301 when the corrected underexposed image is selected by the selection unit 1204*c*. Data of the properly exposed image is output at a pixel position in which the brightness of the object is less than the threshold value, and data of the underexposed image (FIG. 9: the graph line 302) after the gain increasing process is output at other pixel positions. The DR extension unit 1204 outputs DR-extended image data to a white balance (WB) adjustment unit 1205.

The first DR extension process will be described below. Such a process is realized when a program stored in the ROM 1102 is developed in the RAM 1103 and is executed by the CPU of the control unit 1101.

[Procedure 1] The DR extension unit 1204 acquires data of a corrected underexposed image (FIG. 9: the graph line 301) from the shading correction unit 1203.

[Procedure 2] The DR extension unit 1204 acquires data of a properly exposed image (FIG. 9: the graph line 303) via a properly exposed image input unit 205.

[Procedure 3] The position correction unit 1204*a* performs positioning with respect to the corrected underexposed image and the properly exposed image in a predetermined pixel position.

[Procedure 4] The determination unit 1204*b* determines whether brightness of an object in the predetermined pixel position is a threshold value (TH1) or more. When it is determined that the brightness of the object is the threshold value or more, the process moves to the following [Procedure 5], and, when it is determined that the brightness thereof is less than the threshold value, the process moves to [Procedure 6].

[Procedure 5] The selection unit 1204*c* selects the corrected underexposed image between the acquired corrected underexposed image and properly exposed image.

[Procedure 6] The selection unit 1204c selects the properly exposed image between the acquired corrected underexposed image and properly exposed image.

[Procedure 7] The DR extension unit 1204 generates a combination image on the basis of image data selected in [Procedure 5] and [Procedure 6]. At this time, a process of increasing gain of the corrected underexposed image 301 is performed at a pixel position in which the brightness of the object is the threshold value or more (that is, when the corrected underexposed image is selected by the selection unit 1204c). The underexposed image having increased gain (FIG. 9: the graph line 302) is generated.

A second DR extension process according to the second embodiment will be described in detail below. The image processing unit 1107 of FIG. 8 acquires an underexposed image (the first image data) 1201 from an underexposed image input unit and acquires a properly exposed image (the second image data) 1202 from a properly exposed image input unit. The WB adjustment unit 1205 and a signal replacement unit 1206 may be used therefor. The WB adjustment unit 1205 multiplies each signal value of a color signal and a white balance coefficient (referred to as a "WB coefficient"). The WB adjustment unit 1205 adjusts a level of the color signal. For example, when an object image with a gray color is set as an example, an image signal is output as a signal with a gray color in which levels of color signals are aligned. Here, it is assumed that a signal value of a color signal is extracted from a partial area of the second image data, the WB coefficient is acquired, and the imaging unit 1105 sends the second image data and the WB coefficient to the image processing unit 1107. Note that the imaging unit 1105 may acquire the WB coefficient using a known method based on a photometric result or the like of a photometric unit. The WB coefficient is a value indicating an amount of gain for each color signal calculated for each of the color signals. When the signal value of the color signal is multiplied by the WB coefficient, each of the color signals has the same signal value in the object image of the gray color. As a method other than a process of sending the second image data and the WB coefficient to the image processing unit 1107 using the imaging unit 1105, when photographing under a standard light source, the WB coefficient may be set for the image processing unit 1107 in advance. In addition, the WB adjustment unit 1205 may calculate the WB coefficient on the basis of a color temperature input by the user. Alternatively, the WB adjustment unit 1205 may calculate the WB coefficient using a method designated by the user during development without using the WB coefficient added to the second image data. In this case, it is assumed that the user's operation input is received by the input unit 1109. Although two WB adjustment units 1205 illustrated in FIG. 8 perform the same process, an embodiment in which such WB adjustment units 1205 are integrated into a single unit can also be realized.

An example of the WB adjustment process performed by the WB adjustment unit 1205 will be described with reference to FIG. 15. A vertical axis of FIG. 15 indicates a magnitude of a signal value of each color signal (R, G, or B) and indicates comparison data between RAW data and data after WB adjustment. The second image data has the color signals R, G, and B and indicates a sensor saturation value 21 for an imaging element (an image sensor). The sensor saturation value 21 is an upper limit value of a signal value of a color signal determined by the spectral sensitivity characteristics of the imaging element, the process accuracy of the imaging unit 1105, and the predetermined threshold value. Note that, although the sensor saturation value 21 is set to be the same for each of the color signals in the illustrated example, the sensor saturation value 21 may be different for each of the color signals.

Figure 15:
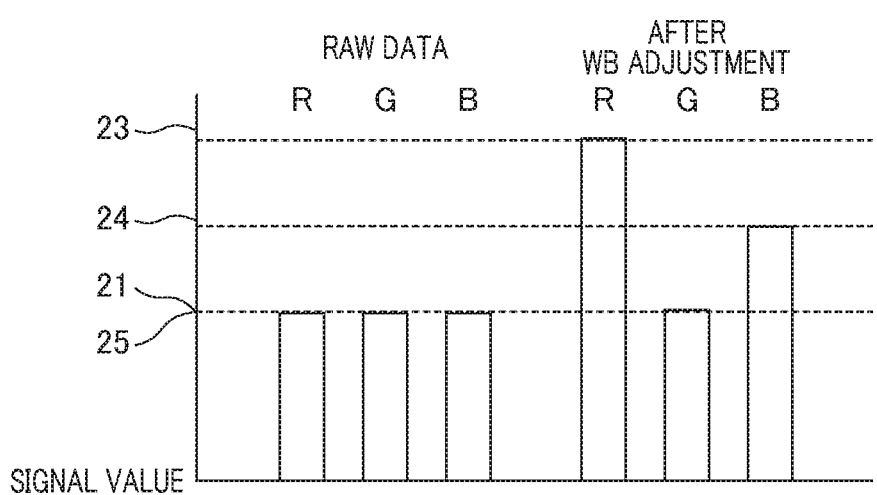
FIG. 15 is a diagram illustrating an example of a WB adjustment process performed by a WB adjustment unit of FIG. 8.

In FIG. 15, the WB adjustment unit 1205 and a result obtained by multiplying a color signal and a WB coefficient is exemplified on the right side as a signal value after WB adjustment. An upper limit value for each color signal changes through multiplication with the WB coefficient. Although signal values of the color signals R, G, and B are aligned in the RAW data, data after the WB adjustment has different signal value for each of the color signals. In the example of FIG. 15, a WB coefficient associated with the color signal R (refer to 23) is "2," a WB coefficient associated with the color signal B (refer to 24) is "1.5," and a WB coefficient associated with the color signal G (refer to 25) is "1." In other words, the saturation level 23 associated with the color signal R is twice the sensor saturation value 21. The saturation level 24 associated with the color signal B is 1.5 times the sensor saturation value 21. The saturation level 25 associated with the color signal G is equal to the sensor saturation value 21.

Figure 16A:
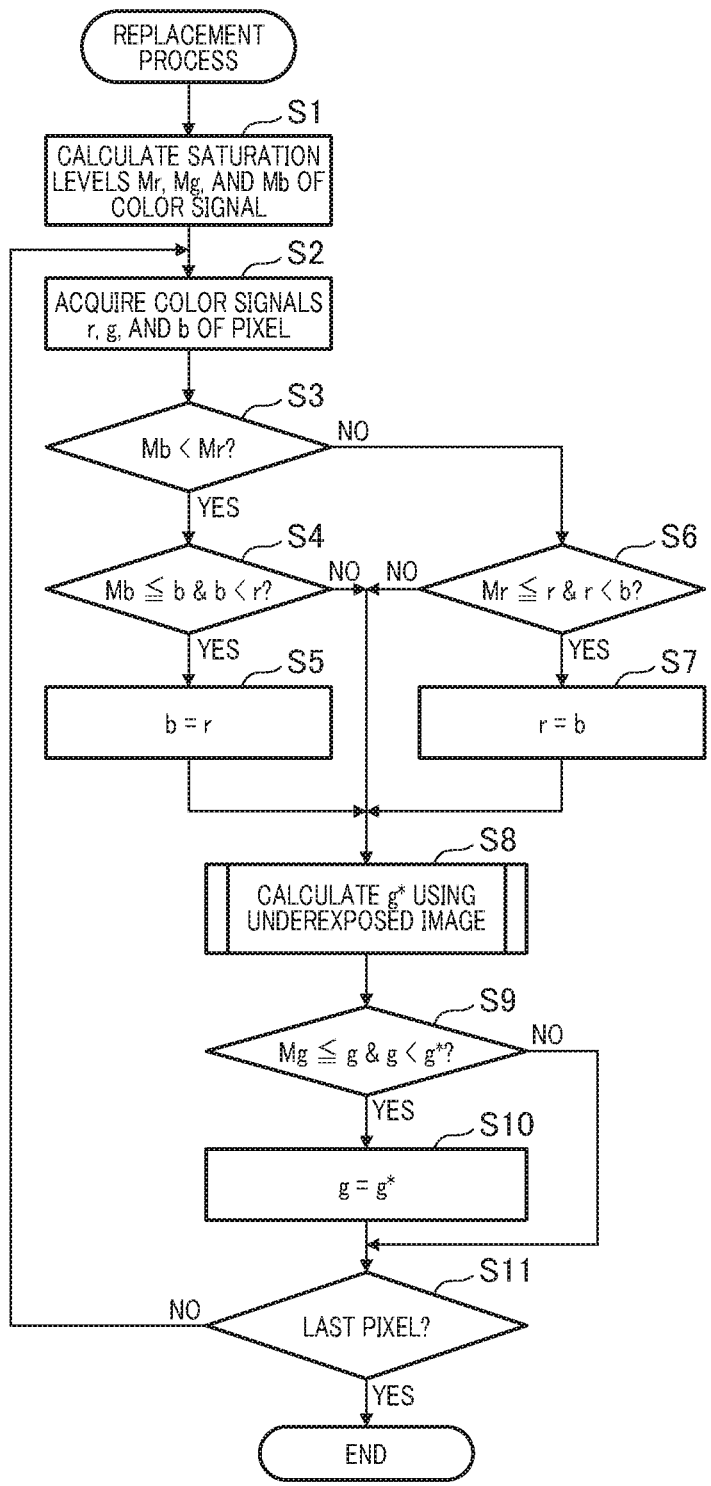
FIGS. 16A and 16B are flowcharts for describing an example of a process performed by a signal replacement unit of FIG. 8.
Figure 16B:
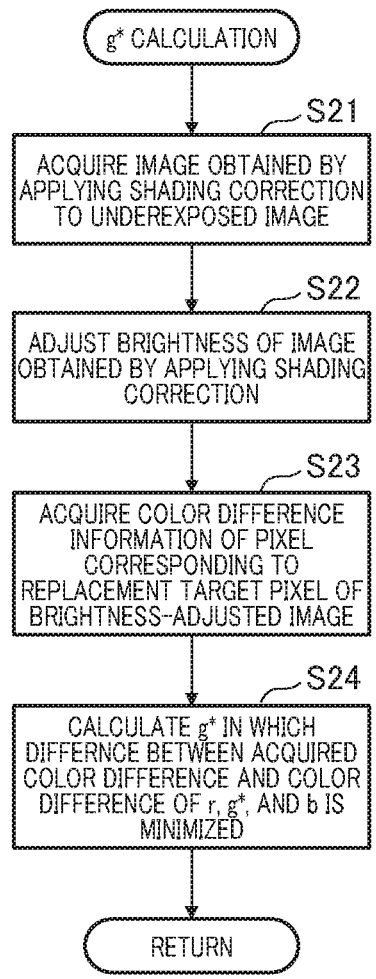

FIGS. 16A and 16B are flowcharts for describing an example of a replacement process performed by the signal replacement unit 1206 of FIG. 8. In the following process, the description will be provided under the assumption that the saturation level of the color signal G is the minimum level and the saturation level of the color signal R is the maximum level or the second level among signal values after the WB adjustment. As described above, when the saturation levels of the color signals are defined, a process which cannot occur due to the characteristics of the imaging unit 1105 can be omitted, and thus the process can be performed at a high speed.

In FIG. 16A, the signal replacement unit 1206 calculates a saturation level for each color signal in second image data (S1). For example, the sensor saturation value 21 (FIG. 15) is calculated in accordance with the second image data. Moreover, the signal replacement unit 1206 multiplies a WB coefficient used for the WB adjustment unit 1205 and the sensor saturation value 21. A value of the saturation level 23 of the color signal R is referred to as "Mr," a value of the saturation level 24 of the color signal B is referred to as "Mb," and a value of the saturation level 25 of the color signal G is referred to as "Mg." Subsequently, the signal replacement unit 1206 acquires r (red), g (green), and b (blue), which are signal values (color signal values) of first pixel, in the second image data (S2). When a Debayer process is not performed in advance in a color interpolation process, the signal replacement unit 1206 calculates a color signal value of a shortage by referring to surrounding pixels.

Subsequently, the signal replacement unit 1206 performs a determination process illustrated in steps S3, S4, and S6 for each pixel of the second image data. First, in S3, the signal replacement unit 1206 compares the saturation level Mr of the color signal R with the saturation level Mb of the color signal B and determines whether "saturation level Mb<saturation level Mr" is satisfied. When it is determined that "saturation level Mb<saturation level Mr" is satisfied (Yes in S3), the process moves to a process of S4. Furthermore, when it is determined that "saturation level Mb saturation level Mr" is satisfied (No in S3), the process moves to a process of S6.

In S4, the signal replacement unit 1206 determines whether a color signal value b reaches the saturation level Mb (that is, Mb≤b) and whether a color signal value r is larger than the color signal value b (that is, b<r). When "saturation level Mb≤color signal value b" and "color signal value b<color signal value r" (Yes in S4), the process moves to a process of S5. When "saturation level Mb>color signal value b" or "color signal value b≥color signal value r" (No in S4), the process moves to a process of S8. In S5, the signal replacement unit 1206 replaces the color signal value b (a replacement target) with the color signal value r (a replacement source). In other words, the signal replacement unit 1206 sets "signal value b=signal value r." Moreover, the process moves to the process of S8.

In S6, the signal replacement unit 1206 determines whether the color signal value r reaches the saturation level Mr (that is, Mr≤r) and whether the color signal value b is larger than the color signal value r (that is, r<b). When "saturation level Mr≤color signal value r" and "color signal value r<color signal value b" (Yes in S6), the process moves to a process of S7. When "saturation level Mr>color signal value r" or "color signal value r color signal value b" (No in S6), the process moves to the process of S8. In S7, the signal replacement unit 1206 replaces the color signal value r with the color signal value b. In other words, the signal replacement unit 1206 sets "signal value r=signal value b." Moreover, the process moves to the process of S8.

In S8, the signal replacement unit 1206 calculates a replacement candidate value using first image data. In other words, the replacement candidate value (denoted as g*) for replacing a color signal value g is calculated. Details of a calculation process (a subroutine of FIG. 16B) of the replacement candidate value g* will be described below. Subsequently, the signal replacement unit 1206 determines whether the color signal value g reaches the saturation level Mg (that is, Mg≤g) and whether the replacement candidate value g* is larger than the color signal value g (that is, g<g*) (S9). When "saturation level Mg≤color signal value g" and "color signal value g<replacement candidate value g*" (Yes in S9), the process moves to a process of S10. When "saturation level Mg>color signal value g" or "color signal value g≥replacement candidate value g*" (No in S9), the process moves to a process of S11.

In S10, the signal replacement unit 1206 replaces the color signal value g with the replacement candidate value g*. In other words, the signal replacement unit 1206 sets "color signal value g=replacement candidate value g*." Subsequently, in S11, the signal replacement unit 1206 determines whether the replacement process has been completed for all of the pixels of the second image data. When the signal replacement unit 1206 determines that the replacement process has not been completed up to the last pixel (No in S11), the process returns to the process of S2. Color signal values r, g, and b are acquired for a pixel at the next position, and the process continues. On the other hand, when it is determined that the replacement process has been completed up to the last pixel (Yes in S11), the signal replacement unit 1206 ends the replacement process associated with the second image data.

A calculation process of S8 will be described with reference to FIG. 16B.

First, the signal replacement unit 1206 acquires data of a shading-corrected underexposed image 301 generated by the shading correction unit 1203 (S21). Subsequently, the signal replacement unit 1206 performs brightness adjustment by performing WB adjustment on each pixel value of a shading-corrected underexposed image and doubling the pixel value (S22). The signal replacement unit 1206 acquires color difference information from a pixel value of an image which has been subjected to brightness adjustment at the same position as a pixel to be replaced (S23). Subsequently, the signal replacement unit 1206 acquires the color signal value g* in which a difference between the color difference acquired in S23 and the color difference of the color signal values r, g*, and b is minimized (S24). When the replacement of the color signal value b is performed in S5 of FIG. 16A, the color signal value b which has been subjected to the replacement process is used for calculation of the replacement candidate value g*. In other words, the color signal value b which has been subjected to the replacement process is used for the calculation of the replacement candidate value g* so that a saturation level of the color signal value g which has been subjected to the replacement process can be matched to saturation levels of the color signal value r and the color signal value b which has been subjected to the replacement process.

In a state in which the saturation level Mb of the color signal value b is normalized to be the saturation level Mr before the replacement of the color signal value b is performed in S5 of FIG. 16A, the replacement candidate value may be set to be "g*=(r+b·Mr/Mb)/2" in S8. The color signal value b obtained by normalizing the saturation level Mb to the saturation level Mr is used for the calculation of the replacement candidate value g* so that the saturation level of the color signal value g which has been subjected to the replacement process can be matched to the saturation levels of the color signal value r and the color signal value b which has been subjected to the replacement process.

Similarly, when the replacement for the color signal value r is performed in S7 of FIG. 16A, the color signal value r which has been subjected to the replacement process is used for the calculation of the replacement candidate value g*. In other words, the color signal value r which has been subjected to the replacement process is used for the calculation of the replacement candidate value g* so that the saturation level of the color signal value g which has been subjected to the replacement process can be matched to saturation levels of the color signal value b and the color signal value r which has been subjected to the replacement process. Also in this case, in a state in which the saturation level Mr of the color signal value r is normalized to be the saturation level Mb before the replacement of the color signal value r is performed in S7, the replacement candidate value may be set to be "g*=(b+r·Mr/Mb)/2" in S8.

A method of calculating the replacement candidate value g* in FIGS. 16A and 16B is not limited to the above-described method (an average value). Examples of such a method include a method of setting "g*=r·b/(r+b)" as a replacement candidate value. Alternatively, examples of such a method include a method of acquiring a replacement candidate value through larger value selection of selecting a larger value among the color signal value r and the color signal value b. Here, a calculation method in which a replacement candidate value can be "g*>>color signal value r" or "g*>>color signal value b" can be adopted. In this case, in S10, a process of adding a value obtained by multiplying a result of "replacement candidate value g*−color signal value g" and a predetermined coefficient to a smaller value of the color signal value r and the color signal value b is performed. A change in color ratio due to the replacement can be minimized by adding a value added to the color signal value g to other signal values.

Figure 17A:
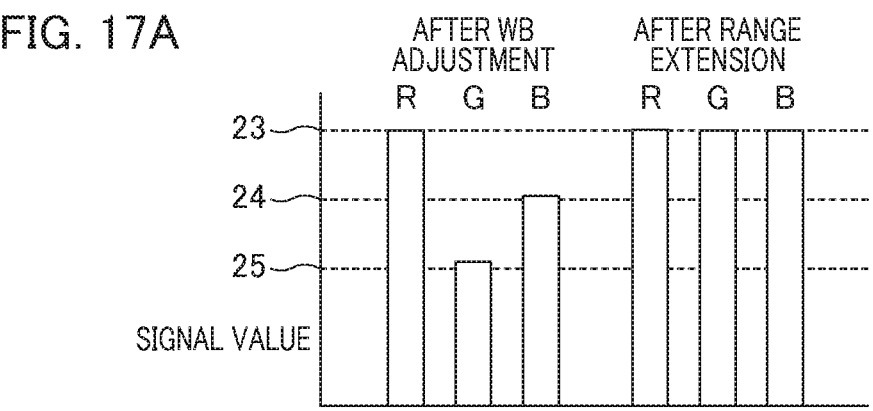
FIGS. 17A to 17D are diagrams for describing data generated through a replacement process of FIGS. 16A and 16B.
Figure 17B:
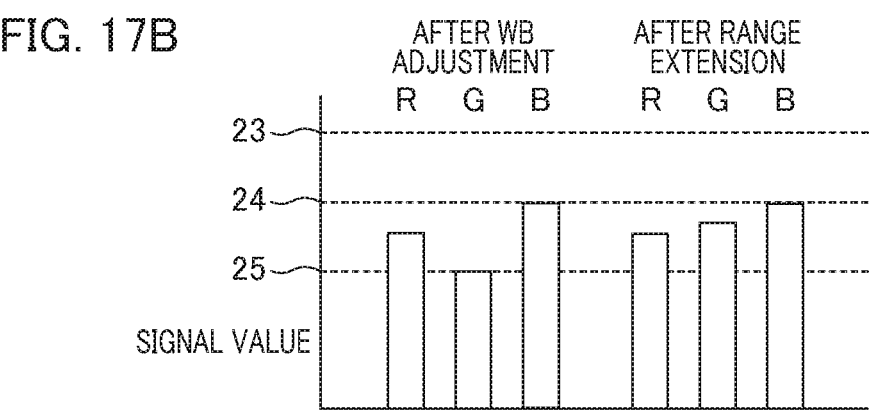
Figure 17C:
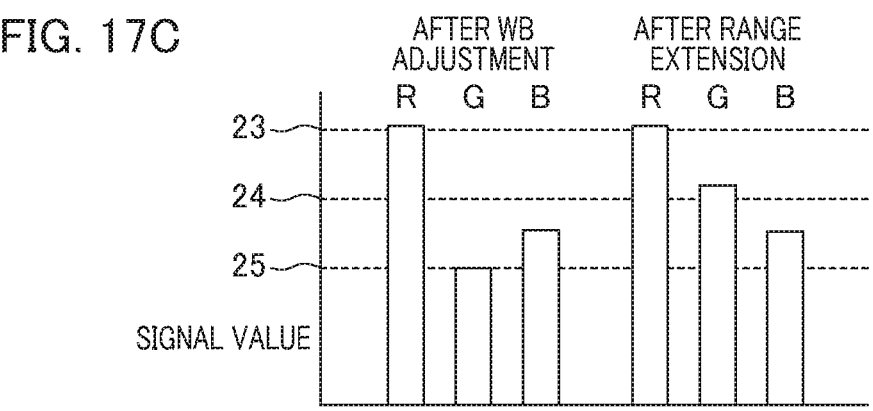
Figure 17D:
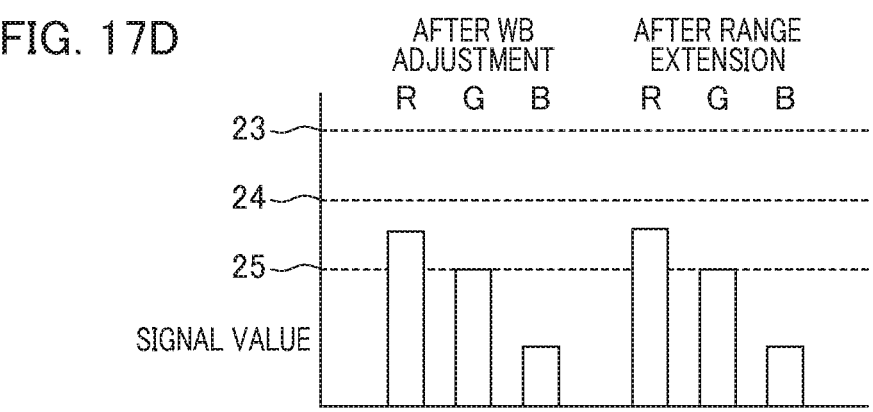

Second image data which has been subjected to a replacement process generated by the replacement process described with reference to FIGS. 16A and 16B will be described in detail with reference to FIGS. 17A to 17D. In FIGS. 17A to 17D, vertical axes indicate magnitudes of signal values (that is, color signal values). The left sides indicate data which has been subjected to WB adjustment and the right, sides indicate data which has been subjected to DR extension. FIG. 17A is a diagram showing a state in which all of the color signals R, G, and B reach saturation levels after the WB adjustment. FIG. 17B is a diagram showing a state in which the color signals G and B reach saturation levels after the WB adjustment. FIG. 17C is a diagram showing a state in which the color signals R and G reach saturation levels after the WB adjustment. FIG. 17D is a diagram showing a state in which only the color signal G reaches a saturation level after the WB adjustment.

In the example illustrated in FIG. 17A, all signal values of the WB-adjusted color signals R, G, and B reach the saturation levels 23, 25, and 24, respectively. The replacement process described with reference to FIGS. 16A and 16B is performed on the color signals R, G, and B and the color signal B is replaced with the color signal R in S5. In addition, in S10, the color signal G is replaced with the replacement candidate value g*. As a result, signal values of the DR-ex tended color signals R, G, and B reach the saturation level 23.

In an example illustrated in FIG. 17B, signal values of the WB-adjusted color signals G and B reach the saturation levels 25 and 24, respectively. The replacement process described with reference to FIGS. 16A and 16B is performed on the color signals R, G, and B, and the replacement of the color signal B is not performed because the color signal R is smaller than the color signal B in S4. On the other hand, in S10, the color signal G is replaced with the replacement candidate value g*. As a result, a signal value of the replaced color signal R is the same as a signal value of the WB-adjusted color signal R. A signal value of the replaced color signal G is an average value of signal values of the WB-adjusted color signals R and B. A signal value of the replaced color signal B is the same as the signal value of the WB-adjusted color signal B.

In the example illustrated in FIG. 17C, signal values of the WB-adjusted color signals R and G reach the saturation levels 23 and 25, respectively. The replacement process described with reference to FIGS. 16A and 16B is performed on the color signals R, G, and B, and the replacement of the color signal B is not performed because the color signal B is not saturated in S4. On the other hand, in S10, the color signal G is replaced with the replacement candidate value g*. As a result, the signal value of the replaced color signal R is the same as a signal value of the WB-adjusted color signal R. A signal value of the replaced color signal G is an average value of signal values of the WB-adjusted color signals R and B. A signal value of the replaced color signal B is the same as the signal value of the WB-adjusted color signal B.

In the example illustrated in FIG. 17D, a signal value of the WB-adjusted color signal G reaches the saturation level 25. The replacement process described with reference to FIGS. 16A and 16B is performed on the color signals R, G, and B, and the replacement of the color signal B is not performed because the color signal B is not saturated in S4. On the other hand, in S9, the replacement of the color signal G is not performed either because the replacement candidate value g* is smaller than a signal value of the color signal G. As a result, signal values of the replaced color signals R, G, and B are the same as signal values of the WB-adjusted color signals R, G, and B.

As described above, in the second embodiment, an effect of improving a gradation in a high brightness area of an image through the replacement process performed by the signal replacement unit 1206 is obtained. An image combination unit 1207 of FIG. 8 acquires data processed by the signal replacement unit 1206 and data which has been subjected to the WB adjustment by the WB adjustment unit 1205, and performs an image combination process which will be described below.

Figure 18:
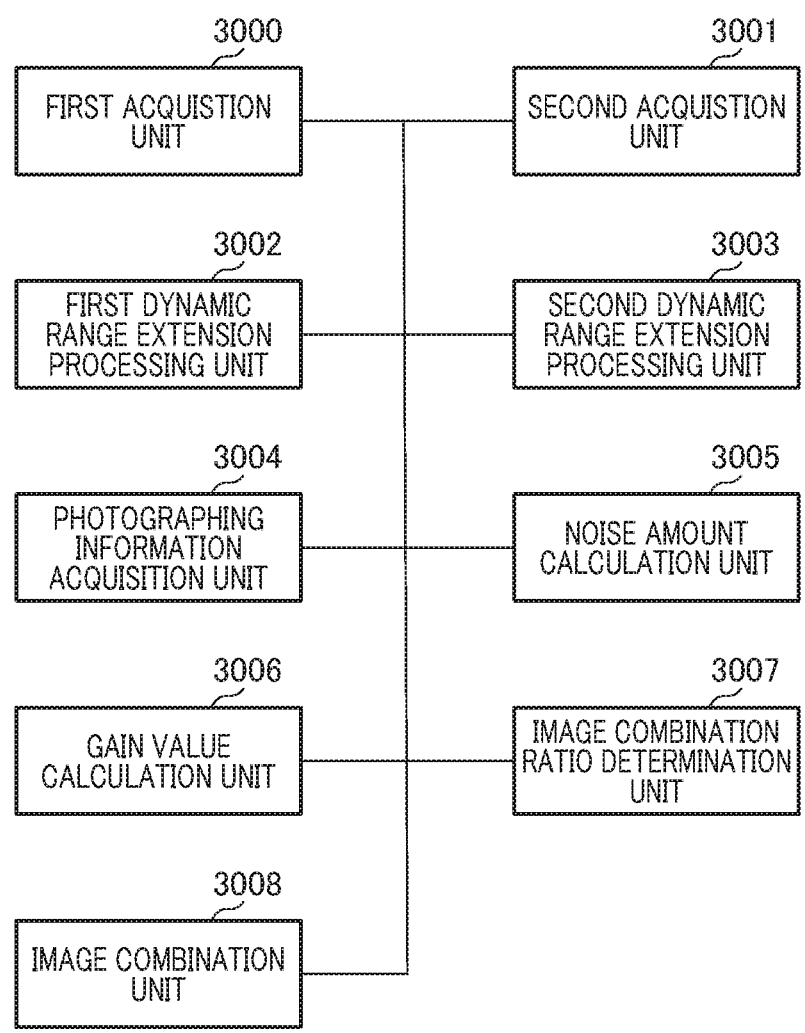
FIG. 18 is a diagram showing a processing unit included in an imaging apparatus according to a first example.

FIG. 18 is a functional block diagram showing a configuration of a first example applied to the digital camera 1100. Processing units shown in FIG. 18 are realized when the control unit 1101 develops and executes a predetermined program or the like read from the recording medium 1108 in the RAM 1103 and units included in the digital camera 1100 perform processes in accordance with instructions from the control unit 1101.

A first acquisition unit 3000 acquires an underexposed image (first image data) from the imaging unit 1105. The acquired first image data is delivered to the image processing unit 1107 via an input unit for the underexposed image and is processed. A second acquisition unit 3001 acquires a properly exposed image (second image data) from the imaging unit 1105. The acquired second image data is delivered to the image processing unit 1107 via an input unit for the properly exposed image and is processed.

A first DR extension processing unit 3002 performs a first DR extension process in the image processing unit 1107 and generates an image which has been subjected to DR extension (hereinafter referred to as a "first extension image"). A second DR extension processing unit 3003 performs a second DR extension process in the image processing unit 1107 and generates an image which has been subjected to the DR extension (hereinafter referred to as a "second extension image").

A photographing information acquisition unit 3004 acquires photographing information added to the first and second image data. The photographing information is setting information or the like for an imaging apparatus when an image is captured. In the second example, a setting value for International Organization for Standardization (ISO) sensitivity is acquired, but the setting value is not limited thereto. In addition, information on setting at a photographing time can be acquired.

A noise amount calculation unit 3005 calculates an amount of noise by the following Equation (1) using the ISO sensitivity acquired by the photographing information acquisition unit 3004;

$$\text{Amount of noise} = \text{ISO sensitivity}/100 \qquad \text{Expression (1)}$$

It is assumed that a value of the amount of noise is within a range of 0 to 100 and clipping is performed at upper and lower limits. Furthermore, there are various known techniques as methods of calculating the amount of noise, and such methods are not limited to the above-described method.

A gain value calculation unit 3006 acquires a shading correction coefficient used in the first DR extension process and a gain value applied to the underexposed image for each pixel, and calculates a gain value obtained by multiplying the acquired shading correction coefficient and gain value. Gain values are calculated using the same scale of 1. An image combination ratio determination unit 3007 determines a combination ratio from the following Expressions (2) and (3) using the amount of noise calculated by the noise amount calculation unit 3005 and the gain value calculated by the gain value calculation unit 3006. It is assumed that each combination ratio of first and second extension images is expressed as a percentage:

$$\text{Combination ratio of first extension image (\%)} = 100 - (\text{amount of noise} \times \text{gain value}) \qquad \text{Expression (2)}$$

Combination ratio of second extension image
(%)=100−(combination ratio of first extension
image)  Expression (3)

A calculation method performed by the image combination ratio determination unit 3007 is not limited to the following calculation expression. Since the first DR extension processing unit 3002 performs increasing of gain on the underexposed image, noise of the first extension image tends to increase relative to that of a properly exposed image. For this reason, the combination ratio of the first extension image is determined in consideration of the fact that the noise increases when ISO sensitivity becomes higher and the fact that a noise ratio of the underexposed image increases when a degree of gain increase becomes larger.

An image combination unit 3008 receives image data generated by the first DR extension processing unit 3002 and the second DR extension processing unit 3003 as inputs and performs the image combination process using a combination ratio determined by the image combination ratio determination unit 3007. Combination image data is generated thereby, and the control unit 1101 performs image display control, an image file recording process, or the like in accordance with a user's operation instruction or the like.

Figure 19:
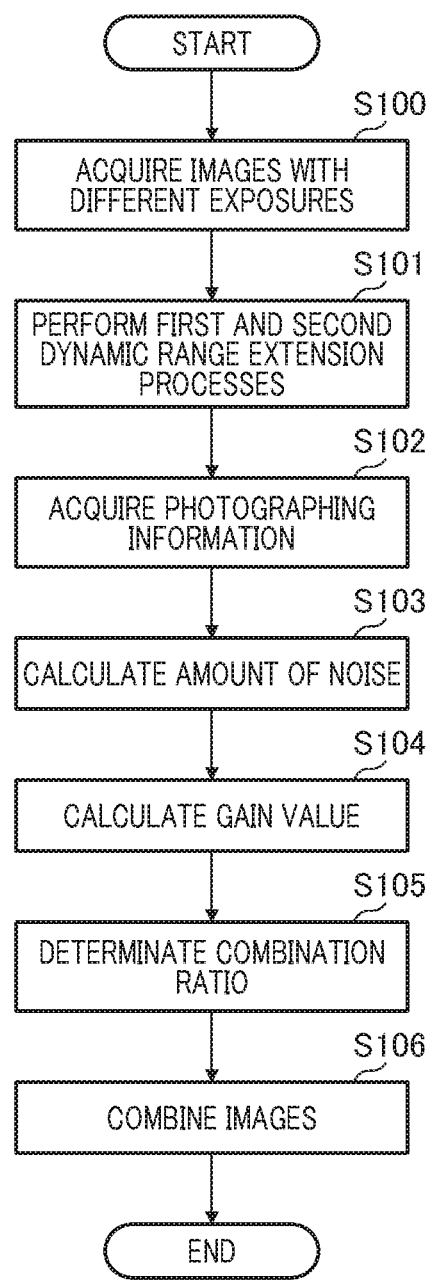
FIG. 19 is a flowchart for describing a process performed by the imaging apparatus according to the first example.

An operation of the digital camera 1100 will be described with reference to a flowchart of FIG. 19. In S100, the first acquisition unit 3000 and the second acquisition unit 3001 acquire first image data and second image data. In S101, the first DR extension processing unit 3002 and the second DR extension processing unit 3003 generate a plurality of DR extension images (first and second extension images) by performing DR extension processes using the acquired first image data and second image data.

In S102, the photographing information acquisition unit 3004 acquires a setting value of ISO sensitivity at a photographing time. Since the first image data and the second image data acquired in S101 are pieces of image data photographed at the same time, the setting values of the ISO sensitivity thereof are the same. In S103, the noise amount calculation unit 3005 calculates an amount of noise using Expression (1). In S104, the gain value calculation unit 3006 acquires a gain value.

In S105, the image combination ratio determination unit 3007 determines a combination ratio of the first and second extension images generated in S102 using Expressions (2) and (3). In S106, the image combination unit 3008 performs a weighted addition process on the images using data of the first and second extension images generated in S102 and the combination ratio determined in S105. The first and second extension images are multiplied by corresponding combination ratios, and then added to each other so that a combination image data is generated, and the generated combination image data is output.

With the above-described configuration, a DR extension process can be performed while an increase in noise or the occurrence of coloring is minimized.

In the second example, since the second DR extension processing unit performs a process on an image which has been subjected to the WB adjustment, the second DR extension processing unit can be applied at the same time as the first DR extension processing unit. Thus, a wider dynamic range extension process can be performed using two processes in combination.

Figure 20:
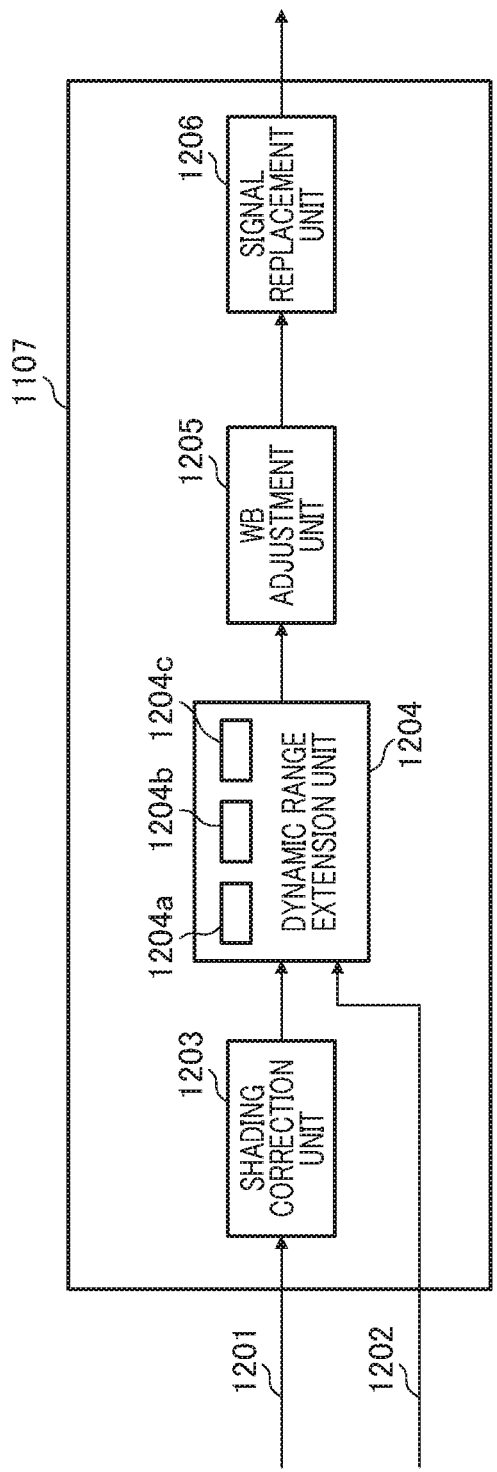
FIG. 20 is a block diagram illustrating an example of a configuration of an image processing unit according to a second example.

A configuration of the second example will be described below with reference to FIGS. 20 to 22. A configuration of an image processing unit 1107 illustrated in FIG. 20 is different from that of the image processing unit illustrated in FIG. 8 in view of the following points.

The DR extension unit 1204 outputs DR-extended image data to the WB adjustment unit 1205, and the WB adjustment unit 1205 performs WB adjustment on the DR-extended image data and outputs the WB-adjusted data to the signal replacement unit 1206.

The signal replacement unit 1206 performs a signal replacement process and the output thereof is an output of the image processing unit 1107.

Figure 21:
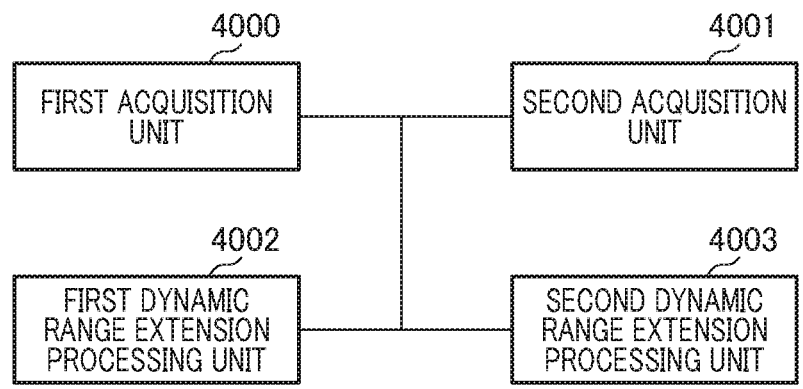
FIG. 21 is a diagram showing a processing unit included in the imaging apparatus according to the second example.
Figure 22:
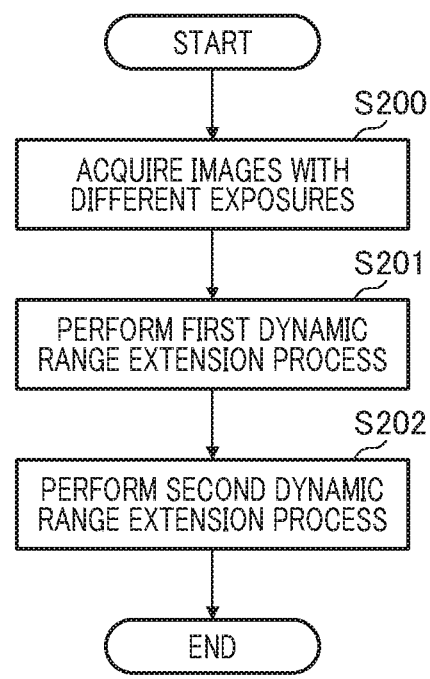
FIG. 22 is a flowchart for describing a process performed by the imaging apparatus according to the second example.

FIG. 21 is a functional block diagram illustrating an example of application to the digital camera 1100. A first acquisition unit 4000 and a second acquisition unit 4001 correspond to the first acquisition unit 3000 and the second acquisition unit 3001 of FIG. 18. Furthermore, a first DR extension processing unit 4002 and a second DR extension processing unit 4003 correspond to the first DR extension processing unit 3002 and the second DR extension processing unit 3003 of FIG. 18. However, the second DR extension processing unit 4003 performs second DR extension process in the image processing unit 1107 using a first extension image as an input image.

A difference between an operation of the digital camera of the second example and that of the first example will be described with reference to a flowchart of FIG. 22. In S200, the first acquisition unit 4000 and the second acquisition unit 4001 acquire first image data and second image data. In S201, the first DR extension processing unit 4002 generates data of the first extension image. In S202, the second DR extension processing unit 4003 performs the second DR extension process on the first extension image and outputs a DR extension image.

A wider dynamic range extension process can be performed using the first and second DR extension processing units.

Although the present invention has been described in detail above on the basis of the preferred embodiments, the present invention is not limited to such specific embodiments, and various embodiments are also included without departing from the gist of the present invention. Some of the above-described embodiments may be appropriately combined.

Application Example

Next, an example in which the first and second embodiments are applied to an imaging apparatus will be described.

Figure 23:
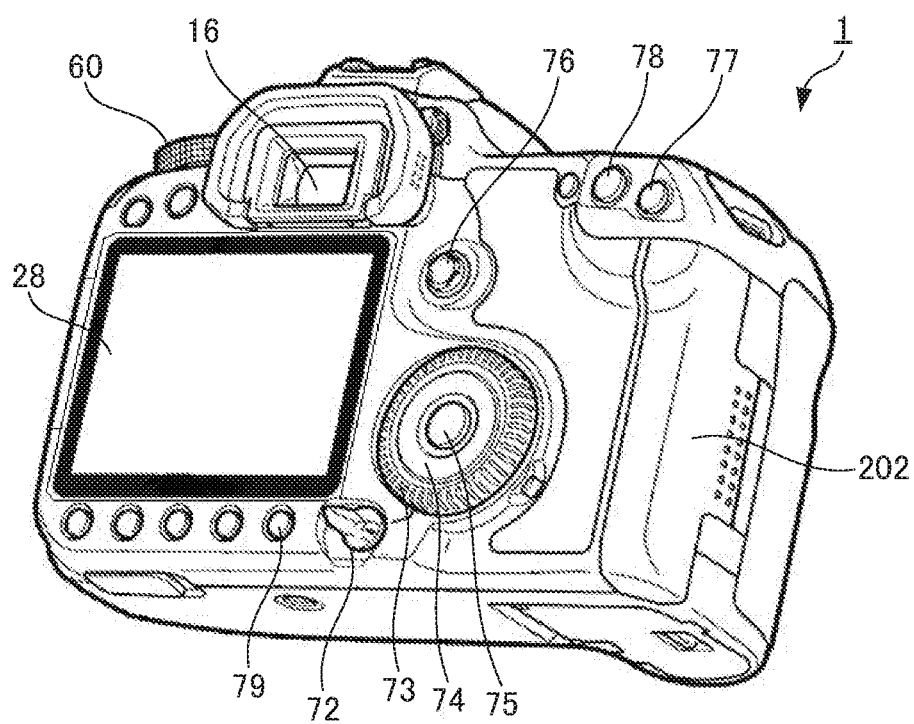
FIG. 23 is a perspective view illustrating an application example of a digital camera.

FIG. 23 is a rear perspective view illustrating an example of a digital camera 1. A display unit 28 is provided on a rear surface of a camera main body and displays a captured image or various types of information. An eyepiece viewfinder 16 is a looking-in type viewfinder configured to check a focus or a composition of an optical image of an object obtained through a lens apparatus while observing a focusing screen.

A mode changeover switch 60 is an operation member configured to switch between various modes. A power supply switch 72 is an operation member configured to switch on and off a power supply of the digital camera 1. A sub-electronic dial 73 is a rotary operation member configured to perform movement of a selection frame, image transferring, or the like. A cross key 74 is a cross key (a four direction key) of which upper, lower, left, and right portions thereof may be pushed. A SET button 75 is a push button and is mainly used for determining selection items or the like. A live view button 76 is a button configured to switch on and off a live view. In a moving image photographing mode, the live view button 76 is used to instruct start or stop of moving image photographing (recording). An enlargement button 77 is an operation button configured to switch on and off an enlargement mode and perform a change of an enlargement ratio during the enlargement mode during a live view display of a photographing mode. In a reproduction mode, the enlargement button 77 functions as an enlargement button configured to enlarge a reproduction image and increase an enlargement ratio thereof. A reduction button 78 is a button configured to reduce the enlargement ratio of the enlarged reproduction image and reduce the displayed image. A reproduction button 79 is an operation button configured to switch between the photographing mode and the reproduction mode. When the reproduction button 79 is pressed during the photographing mode, a mode proceeds to the reproduction mode and the latest image among images recorded on a recording medium can be displayed on the display unit 28. A lid 202 is an opening and closing lid of a slot configured to store the recording medium.

Figure 24:
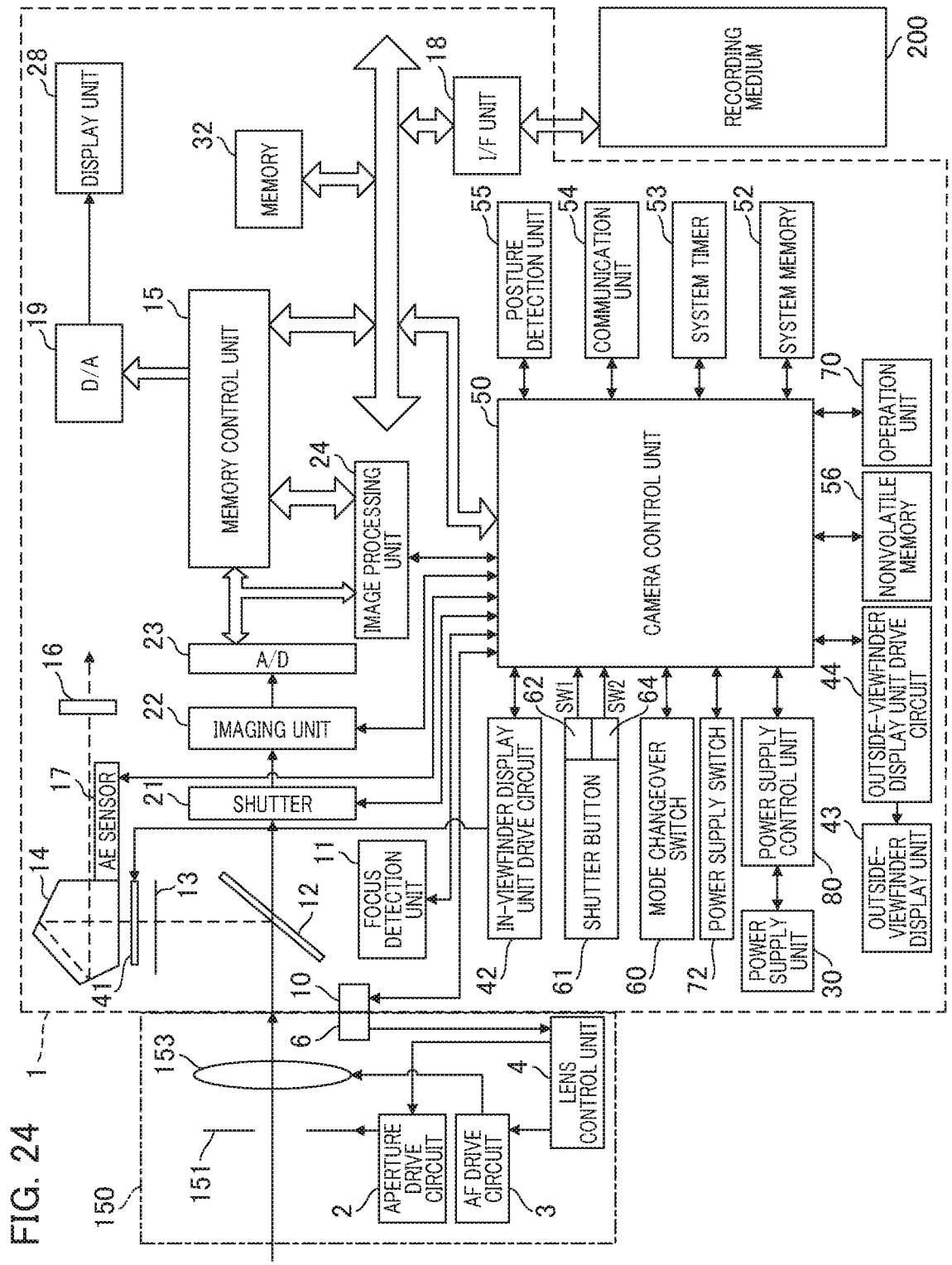
FIG. 24 is a block diagram illustrating an application example of the digital camera.

FIG. 24 is a block diagram illustrating an example of a configuration of the digital camera 1. A mode in which a lens unit 150 is mounted in the camera main body and used will be exemplified. The lens unit 150 includes a lens 153. Although an imaging optical system is constituted of a plurality of lenses, only one lens is illustrated in FIG. 24. A communication terminal 6 is a communication terminal through which the lens unit 150 communicates with the main body of the digital camera 1. A communication terminal 10 is a communication terminal through which the main body of the digital camera 1 communicates with the lens unit 150. A lens control unit 4 communicates with a camera control unit 50 of the main body through the communication terminals 6 and 10. The lens control unit 4 controls a diaphragm 151 via a diaphragm drive circuit 2, moves a focus lens via an autofocus (AF) drive circuit 3, and thus performs focus adjustment.

The camera main body includes a quick return mirror (hereinafter simply referred to as a "mirror") 12. The mirror 12 is driven to be in an up state or a down state by an actuator at an exposure time, a live view photographing time, and a moving image photographing time. The mirror 12 is a movable reflecting member configured to switch a luminous flux incident through the imaging optical system between the viewfinder 16 side and an imaging unit 22 side. The mirror 12 reflects the luminous flux to be guided to the viewfinder 16 in the down state and the mirror 12 is retracted such that the luminous flux is guided to the imaging unit 22 in the up state. Furthermore, the mirror 12 is a half mirror such that a part of light can pass through a central portion thereof and a part of a luminous flux is incident on a focus detection unit 11. The focus detection unit 11 performs a focus detection process and outputs defocus amount information to the camera control unit 50. The camera control unit 50 performs a phase difference detection type autofocus (AF) process and performs focus adjustment control for the lens unit 150.

The light reflected by the mirror 12 in the down state is guided to a focusing screen 13, a pentaprism 14, and the viewfinder 16. The user can check a focus state or a composition for an optical image of an object obtained through the lens unit 150 by observing the focusing screen 13 via the pentaprism 14 and the viewfinder 16. An automatic exposure (AE) sensor 17 is constituted of two-dimensionally arranged photoelectric conversion elements and measures brightness of the object from light acquired through the lens unit 150. For example, the AE sensor 17 has an array of R(IR)GB pixels in a Bayer array and can also perform color measurement, object detection, distance measurement, or the like.

A shutter 21 is a focal plane shutter capable of controlling an exposure time of the imaging unit 22 in accordance with a control instruction of the camera control unit 50. The imaging unit 22 corresponds to the imaging unit 108 of FIG. 1A or the imaging unit 1105 of FIG. 7 and includes an imaging element using a charge coupled device (CCD), a complementary metal oxide semiconductor (CMOS) device, or the like configured to convert an optical image into an electrical signal. Such an imaging element is a pupil division type imaging element having a pixel configuration including a plurality of microlenses and a plurality of photoelectric conversion units corresponding to the microlenses. An A/D converter 23 converts an analog signal acquired from the imaging unit 22 into a digital signal.

An image processing unit 24 corresponds to the image processing unit 1107 of FIG. 7 and performs a predetermined process in accordance with a control instruction of the camera control unit 50. Such a predetermined process includes a developing process, which has a correction process, a demosaicing process, a WB adjustment process, a gamma correction process, and the like, a color conversion process, an encoding-compression process, and the like performed on data from the A/D converter 23 or data from a memory control unit 15. The image processing unit 24 performs a refocus process using parallax, a visual point change process, or a DR extension process using a plurality of pieces of visual point image data acquired from a pupil division type imaging element. In addition, the image processing unit 24 calculates an amount of image shift on the basis of phase differences among a plurality of visual point images. The calculated amount of image shift corresponds to depth information indicating a relative positional relationship in a depth direction of an object in an image. An amount of image shift can be converted into an amount of defocus and depth information of an object distance using a coefficient (a K value) from the imaging element 110 or the lens 153 as necessary.

The camera control unit 50 corresponds to the control unit 101 of FIG. 1A or the control unit 1101 of FIG. 7 and controls an operation of each unit constituting an imaging system. For example, the camera control unit 50 performs exposure control or focus adjustment control on the basis of an operation result acquired when the image processing unit 24 performs a predetermined arithmetic process. Thus, a through-the-lens (TTL) type AF process, an AE process, or an EF (flash pre-light emission) process is performed. Note that, although a configuration in which the camera control unit 50 and the image processing unit 24 are set to be separate processing unit has been described in the second example, when the camera control unit 50 includes an image processing processor, control and an image process can be performed using one processing unit.

The memory control unit 15 performs a process of storing output data from the A/D converter 23 or data processed by the image processing unit 24 in a memory 32. The memory 32 stores digital data from the A/D converter 23 or image data to be displayed on the display unit 28. The memory 32 also serves as a memory (a video memory) for displaying an image. A digital/analog (D/A) converter 19 converts data for displaying an image stored in the memory 32 into an analog signal and supplies the data to the display unit 28. The displayed image data written in the memory 32 is read by the memory control unit 15 and is displayed on the screen of the display unit 28 via the D/A converter 19. The display unit 28 includes a display device such as a liquid crystal display panel and presents the UI screen 2001, 2101, or the like of FIG. 2A to the user in accordance with a control instruction of the camera control unit 50. Furthermore, in a through image display (live view display) mode, a digital signal A/D converted by the A/D converter 23 one time and stored in the memory 32 is analog-converted by the D/A converter 19 and is sequentially transferred to the display unit 28 to display an image.

An in-viewfinder liquid crystal display unit 41 is disposed between the focusing screen 13 and the pentaprism 14 and displays an AF frame (a focus detection frame), an icon representing a setting state of a camera, or the like by an in-viewfinder display unit drive circuit 42. A setting value of a shutter speed, a diaphragm, or the like is displayed on an outside-viewfinder liquid crystal display unit 43 via an outside-viewfinder display unit drive circuit 44.

A nonvolatile memory 56 is an electrically erasable and storable memory and may be, for example, an electrically erasable programmable read-only memory (EEPROM) or the like. Constants, programs, and the like for operations of the camera control unit 50 are stored in the nonvolatile memory 56. The CPU of the camera control unit 50 realizes each process of the embodiments of the present invention by executing a program stored in the nonvolatile memory 56. A random access memory (RAM) is used for a system memory 52. Constants and variables for the operations of the camera control unit 50, a program read from the nonvolatile memory 56, or the like are developed in the system memory 52. A system timer 53 is a timing unit configured to measure time used for various controls.

The user can instruct the camera control unit 50 using various operation members. FIG. 24 illustrates the mode changeover switch 60, a first shutter switch 62, and a second shutter switch 64. A mode which can be switched by the mode changeover switch 60 includes a still image recording mode, the moving image photographing mode, the reproduction mode, and the like. The first shutter switch 62 is turned on in the course of an operation of a shutter button 61, that is, a so-called half-pressing (a photographing preparation instruction), and generates a first shutter switch signal SW1. An operation such as an AF process, an AE process, an AWB (an auto white balance) process, or an EF (flash pre-light emission) process is started by the first shutter switch signal SW1. The second shutter switch 64 is turned on when an operation of the shutter button 61 is completed, that is, a so-called full-pressing (a photographing instruction), and generates a second shutter switch signal SW2. A series of photographing operations are started by the second shutter switch signal SW2. An operation unit 70 includes other operation members, for example, various function icons and operation objects displayed on the display unit 28. Such operation objects are the radio buttons or the checkboxes (2108 to 2114), the WP indexes (2005 and 2105), or the like shown in FIG. 2B, and are various function buttons in which functions are appropriately assigned for every designated screen. The user can perform a setting or adjustment operation using an operation object or an operation member while viewing a UI screen displayed on the display unit 28. The operation unit 70 corresponds to the operation unit 105 of FIG. 1A or the input unit 1109 of FIG. 7.

The power supply switch 72 is used when the user turns on and off a camera power supply. A power supply control unit 80 is constituted of a battery detect ion circuit, a direct current-direct current (DC-DC) converter, a switch circuit configured to switch among blocks to which electricity is to be applied, and the like, and detects the presence or absence of a mounted battery, a type of battery, and a remaining battery level. A power supply unit 30 includes a primary battery, a secondary battery, an AC adapter, or the like. The power supply control unit 80 controls the DC-DC converter in accordance with an instruction of the camera control unit 50 and supplies electric power to units including a recording medium 200.

A recording medium interface (I/F) unit 18 is an interface unit with the recording medium 200 such as a memory card or a hard disk. The photographed image data or the like is recorded on the recording medium 200 via the recording medium I/F unit 18. Furthermore, data recorded on the recording medium 200 is stored in the memory 32 through the recording medium I/F unit 18. The recording medium 200 corresponds to the external storage apparatus 104 of FIG. 1A or the recording medium 1108 of FIG. 7.

A communication unit 54 can be connected to a wireless local area network (LAN) or the Internet. The communication unit 54 can transmit captured image data using the imaging unit 22 or image data recorded on the recording medium 200 and can receives various types of information such as image data from an external apparatus. A posture detection unit 55 includes an acceleration sensor, a gyro sensor, or the like and detects a posture of a camera with respect to a gravity direction. The camera control unit 50 determines whether the user performs photographing while gripping the camera in a horizontal orientation or while gripping the camera in a vertical orientation on the basis of the posture detected by the posture detection unit 55. The camera control unit 50 performs a process of adding orientation information according to the posture detected by the posture detection unit 55 to an image file or rotating an image and performing recording.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform, the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU) and a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-254385, filed Dec. 27, 2016, which is hereby incorporated by reference wherein in its entirety.

What is claimed is:

1. An image processing apparatus which performs a plurality of gradation processes on image data, the image processing apparatus comprising:
one or more processors; and
a memory storing instructions which, when the instructions are executed by the one or more processors, cause the image processing apparatus to function as:
an acquisition unit configured to acquire a plurality of pieces of visual point image data having different visual points;
a first processing unit configured to generate image data in which a dynamic range is extended using the plurality of pieces of visual point image data;
a second processing unit configured to determine a saturation level of a color signal of the image data and generate image data having the extended dynamic range; and
a combination unit configured to combine images generated by the first and second processing units,
wherein the acquisition unit acquires first image data from a first photoelectric conversion unit and acquires second image data obtained by adding the first image data and image data acquired from a second photoelectric conversion unit, the first photoelectric conversion unit and the second photoelectric conversion unit being configured to receive light passing through different pupil areas of an imaging optical system, and
wherein the second processing unit calculates a saturation level of a color signal associated with the second image data and determines whether to perform a replacement process of the color signal from a color signal value and the saturation level for each pixel, and performs the replacement process of the color signal using color difference information of the first image data when performing the replacement process.

2. The image processing apparatus according to claim 1, wherein:
the first processing unit generates image data in which a dynamic range is extended using the first and second image data, and
the second processing unit determines a saturation level of a color signal of the second image data and generates image data in which a dynamic range is extended.

3. The image processing apparatus according to claim 2, wherein the first processing unit performs a process, and then the second processing unit performs a process.

4. The image processing apparatus according to claim 2, wherein the acquisition unit acquires information at a time at which the first and second image data are captured, and the combination unit calculates an amount of noise included in the image data and determines a combination ratio of the image data generated by the first and second processing units.

5. The image processing apparatus according to claim 4, wherein the first processing unit calculates a gain value for the visual point image data, and
the combination unit changes the combination ratio in accordance with the gain value.

6. The image processing apparatus according to claim 1, comprising:
a developing processing unit configured to perform a developing process on image data on which the replacement process has been performed.

7. An imaging apparatus comprising:
an image processing apparatus according to claim 1 and an imaging element configured to capture an object.

8. An image processing method which is performed in an image processing apparatus configured to perform a plurality of gradation processes on image data, the image processing method comprising:
a step of acquiring a plurality of pieces of visual point image data having different visual points;
a first processing step of generating image data in which a dynamic range is extended using the plurality of pieces of visual point image data, and a second processing step of generating image data in which a dynamic range is extended by determining a saturation level of each color signal of the image data; and
a step of combining images generated by the first and second processing steps,
wherein the step of acquiring acquires first image data from a first photoelectric conversion unit and acquires second image data obtained by adding the first image data and image data acquired from a second photoelectric conversion unit, the first photoelectric conversion unit and the second photoelectric conversion unit being configured to receive light passing through different pupil areas of an imaging optical system, and
wherein the second processing step calculates a saturation level of a color signal associated with the second image data and determines whether to perform a replacement process of the color signal from a color signal value and the saturation level for each pixel, and performs the replacement process of the color signal using color difference information of the first image data when performing the replacement process.

9. A non-transitory recording medium storing a control program of an image processing apparatus causing a computer to perform each step of a control method according to claim 8.

* * * * *